US011874029B2

(12) United States Patent
Hudson et al.

(10) Patent No.: US 11,874,029 B2
(45) Date of Patent: Jan. 16, 2024

(54) SYSTEMS, METHODS, AND MACHINES FOR JOINING TRUSS FOUNDATION COMPONENTS

(71) Applicant: Ojjo, Inc., San Rafael, CA (US)

(72) Inventors: Tyrus Hudson, Petaluma, CA (US); Johann Karkheck, Petaluma, CA (US); Charles Almy, Berkeley, CA (US); Jack West, San Rafael, CA (US); Greg McPheeters, Santa Cruz, CA (US)

(73) Assignee: Ojjo, Inc., San Rafael, CA (US)

( * ) Notice: Subject to any disclaimer, the term of this patent is extended or adjusted under 35 U.S.C. 154(b) by 93 days.

(21) Appl. No.: 17/152,622

(22) Filed: Jan. 19, 2021

(65) Prior Publication Data

US 2021/0172655 A1    Jun. 10, 2021

Related U.S. Application Data

(63) Continuation-in-part of application No. 17/064,362, filed on Oct. 6, 2020, now Pat. No. 11,519,637, which
(Continued)

(51) Int. Cl.
*F24S 25/00* (2018.01)
*F24S 25/13* (2018.01)
(Continued)

(52) U.S. Cl.
CPC ............ *F24S 25/13* (2018.05); *F24S 30/425* (2018.05); *F24S 50/20* (2018.05); *H02S 20/10* (2014.12); *H02S 20/32* (2014.12)

(58) Field of Classification Search
CPC ....... F16B 2/12; F16B 9/023; F24S 2025/802; F24S 25/70; F24S 25/12; F24S 25/632; F24S 25/20; F24S 25/636; F24S 25/65; F24S 25/13; F24S 30/425; F24S 50/20; H02S 20/24; H02S 20/10; H02S 20/32; H01L 31/042; Y10T 24/44043; Y02B 10/20; Y02B 10/12; Y02E 10/47
(Continued)

(56) References Cited

U.S. PATENT DOCUMENTS 5,600,870 A *  2/1997  Fields ................... E05D 11/105
                                                        403/93
6,419,519 B1 *  7/2002  Young ................ H01R 13/5812
                                                        439/446
(Continued)

FOREIGN PATENT DOCUMENTS

EP          2413064 A2    2/2012

OTHER PUBLICATIONS

International Search Report for PCT/US2021/014327.

*Primary Examiner* — Chi Q Nguyen
(74) *Attorney, Agent, or Firm* — Phillip D. Mancini

(57) ABSTRACT

A coupler for joining truss leg components provides angular adjustability between the respective axis of the leg components. A prolate spheroid-shaped coupler with three channels circumscribing its surface enables the upper leg components to compensate for axial misalignment of driven screw anchors in all directions. A hydraulic crimping device with upper and lower crimping guides registers its position with features on the truss hardware to insure that blind triple crimps are performed consistently each time.

2 Claims, 21 Drawing Sheets

Related U.S. Application Data is a continuation of application No. 16/422,698, filed on May 24, 2019, now Pat. No. 10,837,677.

(60) Provisional application No. 62/801,604, filed on Feb. 5, 2019, provisional application No. 62/745,188, filed on Oct. 12, 2018, provisional application No. 62/727,456, filed on Sep. 5, 2018.

(51) Int. Cl.
*F24S 30/425* (2018.01)
*H02S 20/10* (2014.01)
*F24S 50/20* (2018.01)
*H02S 20/32* (2014.01)

(58) Field of Classification Search
USPC .......... 52/173.3; 136/244; 126/600; 248/237
See application file for complete search history.

(56) References Cited

U.S. PATENT DOCUMENTS

| | | | |
|---|---|---|---|
| D480,717 S * | 10/2003 | Imai | D14/248 |
| 6,802,328 B2 * | 10/2004 | Lin | A47C 3/0255 403/56 |
| 7,413,159 B2 * | 8/2008 | Liang | G06F 1/181 248/676 |
| 7,516,935 B2 * | 4/2009 | Liang | F16M 11/10 248/676 |
| 7,607,201 B2 * | 10/2009 | Lin | H04M 1/0216 16/334 |
| 10,615,739 B2 * | 4/2020 | West | F24S 30/425 |
| 10,837,677 B2 * | 11/2020 | Hudson | F24S 25/70 |
| 10,935,070 B2 * | 3/2021 | Klein | F16C 11/0695 |
| 11,121,671 B2 * | 9/2021 | Hudson | F24S 30/425 |
| 2005/0278894 A1 * | 12/2005 | Lin | G06F 1/1686 16/334 |
| 2008/0261428 A1 * | 10/2008 | Brodeur | H02G 3/06 439/246 |
| 2014/0206227 A1 * | 7/2014 | Kern | H01R 13/5841 29/857 |
| 2015/0069198 A1 | 3/2015 | West et al. | |
| 2017/0001270 A1 | 1/2017 | Chang | |
| 2018/0051915 A1 * | 2/2018 | Rainer | F24S 25/10 |
| 2018/0131170 A1 * | 5/2018 | Maass | H02G 15/013 |
| 2020/0072505 A1 | 3/2020 | Hudson et al. | |
| 2021/0254298 A1 * | 8/2021 | Kaufman | E02D 5/56 |
| 2021/0257962 A1 * | 8/2021 | McPheeters | F24S 25/12 |

\* cited by examiner

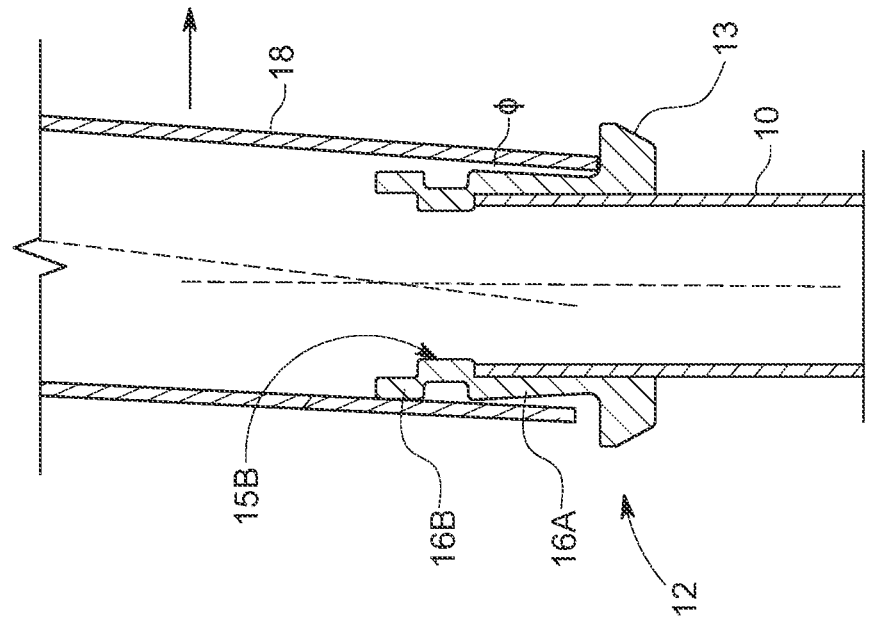
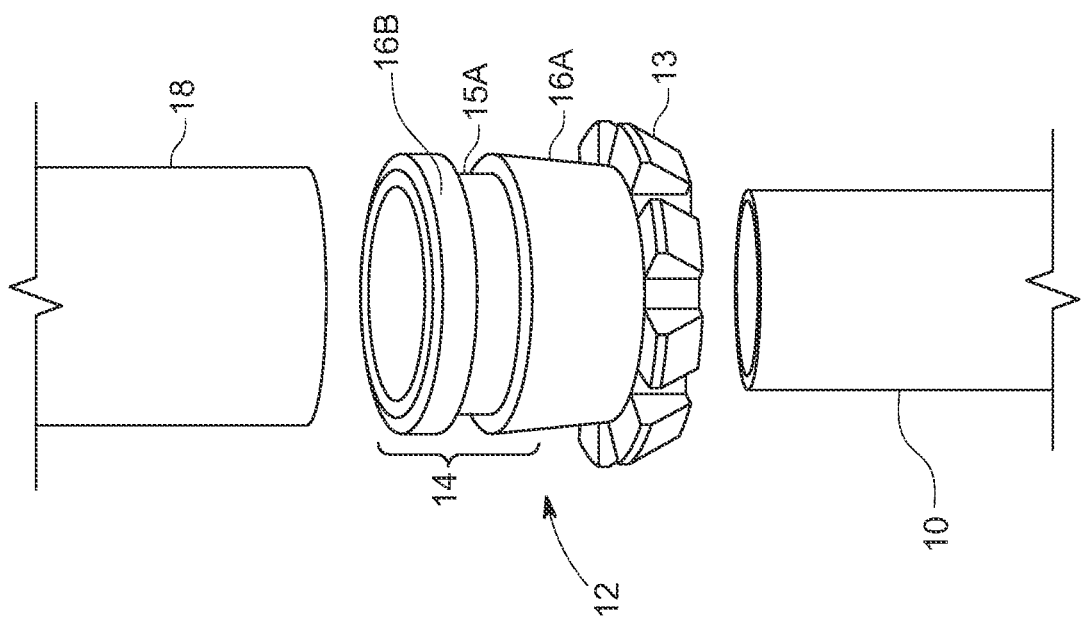

SYSTEMS, METHODS, AND MACHINES FOR JOINING TRUSS FOUNDATION COMPONENTS

CROSS-REFERENCE TO RELATED APPLICATIONS

This is a Continuation-in-Part of U.S. utility patent application Ser. No. 17/064,362 filed on Oct. 6, 2020, titled "Multi-piece truss legs and related couplers," which is a continuation of U.S. utility patent application Ser. No. 16/422,698 filed on May 24, 2019, titled "Multi-piece truss legs and related couplers," now U.S. Pat. No. 10,837,677, which claims priority to claims priority to U.S. Provisional Patent Application No. 62/801,604, titled, "Articulating pile couplers and related systems and methods," filed on Feb. 5, 2019, U.S. Provisional Patent Application No. 62/745,188, titled "Optimized A-frame foundations for axial solar arrays and related systems and methods," filed on Oct. 12, 2018, and U.S. Provisional Patent Application No. 62/727,456, titled, "Foundation piers for axial solar arrays and related systems and methods," filed on Sep. 5, 2018, the disclosures of which are all hereby incorporated by reference in their entirety.

BACKGROUND

Until recently, single-axis solar trackers have been built predominately on monopile foundations. Monopiles consist of individual I-beams driven into the ground with a pile driver at regular intervals along an intended North-South tracker row. These driven beams support the torque tube bearing assemblies and the drive motor of the single-axis tracker; solar panels are subsequently attached to the torque tube to complete the system. The monopile paradigm requires that each foundation beam be over-specified in strength and driving depth in order to support not only the weight of the system (torque tube, panels, motors, and mounting hardware) but also to resist bending moments introduced by wind striking the array; such wind forces are known as lateral loads. Because single structural members are relatively poor at resisting bending, heavier beams and greater embedment depths are required to enable monopiles to resist lateral loads. Therefore, monopiles are an inherently wasteful foundation solution for single-axis trackers due to the way that they resist lateral loads.

To address this inefficiency, the applicant and inventors of this disclosure have developed a truss foundation system that uses A-frame-shaped trusses rather than monopiles. The system is known commercially as EARTH TRUSS. Truss foundations are advantageous relative to monopiles because they translate lateral loads into axial forces of tension and compression rather than bending moments. Since single structural members are relatively good at resisting axial forces, smaller foundation components and shallower embedment depths may be used relative to monopiles, saving steel, and reducing labor costs.

The EARTH TRUSS foundation is constructed by driving a pair of adjacent screw anchors into the ground so that they are angled towards one another on either side of an intended North-South tracker row. This may be done, for example, with a rotary driver or screw anchor driving machine. The machine may be a purpose-built device or an attachment to an excavator or other piece of general-purpose heavy equipment. Once the pair of adjacent screw anchors are driven to their target embedment depth, upper legs are joined to each screw anchor, and an adapter, bearing adapter or other assembly connects the free ends of each upper leg to complete the truss and to provide a platform to support subsequent tracker components.

Whether A-frames or monopiles are used, adherence to positional tolerances is important when constructing tracker foundations to prevent undue stress on the tracker torque tube and/or to require positional mediation prior to assembling the tracker. The EARTH TRUSS foundation presents unique challenges in this regard relative to monopiles due to their multi-piece construction. At each foundation location, two separate non-plumb piles must be driven into the ground on either side of tracker row, substantially perpendicular to the torque tube or axis of rotation. Even with machine automation, it is possible that the respective axes of two adjacent piles do not intersect because the piles are driven offset to one another (i.e., out of alignment about the rotational axis). Alternatively, in some cases they may be aligned about either side of the tracker row but intersect at a point below or above the desired intersection height (i.e., driven at the incorrect angle). Just as with monopiles, misalignment of foundation components from their intended axes, may induce strain on the torque tube and even make it impossible to install tracker components without reorienting the foundation first. To that end, the focus of this disclosure is on components and systems for rapidly, securely, and inexpensively interconnecting tracker foundation components while correcting for any misalignment incurred while driving the below ground components.

BRIEF DESCRIPTION OF THE DRAWINGS

FIGS. 5A and 5B show exploded and cutaway views respectively of truss leg components joined by a driving coupler according to various embodiments of the invention;

DETAILED DESCRIPTION

The following description is intended to convey a thorough understanding of the embodiments described by providing a number of specific embodiments and details involving A-frame-shaped truss foundations supporting single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

As discussed in the Background above, the inventors and applicant of this disclosure have developed an alternative to plumb monopile foundations that aims to significantly reduce the total amount of steel required to support single-axis trackers and other axial solar arrays as well as the costs associated with constructing them. Known commercially as EARTH TRUSS, this foundation system consists of a pair of angled truss legs extending above and below ground and are joined at the apex with an adapter, bearing assembly, or other unifying torque tube support structure to form a truss with the ground. The truss legs are substantially aligned on either side of the torque tube and ideally oriented so that an imaginary line through their respective centers of mass intersects at a point in space that overlaps or is above the tracker's axis of rotation and is perpendicular to it.

The truss architecture offers several advantages over monopiles foundations.

First, if properly designed, it will efficiently translate lateral loads into axial forces of tension and compression in the legs rather than putting the foundation into bending. Trusses directs lateral loads along the axes of the legs where they are best applied. Therefore, the size and gauge of the steel that makes up the legs may be much smaller than an equivalent monopile. Also, without needing to resist bending, the legs do not need to be driven as deep as monopiles must be. Not only does this save steel but it also reduces the likelihood of encountering a refusal. A refusal occurs when additional impacts of a pile driver fail to result in further embedment of the pile. Usually, this is the result of striking rock or cementitious soil and requires an expensive, labor-intensive mitigation process that may increase the costs of the foundation by up to ten-fold over successful pile driving. The shallower piles are driven, the less likely it is that refusals will occur, therefore reducing refusals saves money. Finally, because the base component of the truss foundation, the screw anchor, is open at both ends, a drilling tool or other instrument may be actuated through it while it is being driven into the ground to further reducing the chances of refusal without the extra time and cost of pre-drilling.

Figure 1:
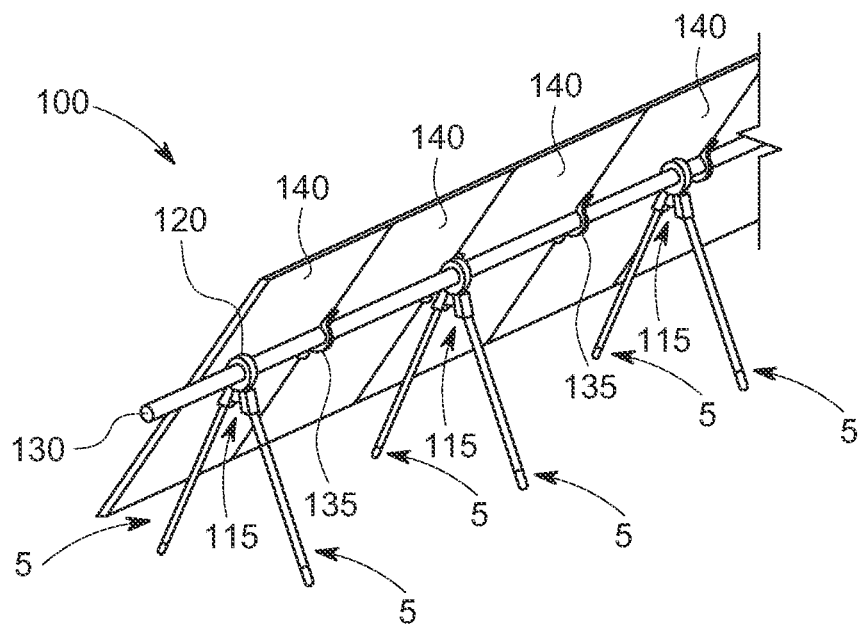
FIG. 1 shows a portion of a single-axis tracker supported by a truss foundation according to various embodiments of the invention.

Turning now to FIG. 1, this figure shows a portion of single-axis tracker 100 supported by several A-frame-shaped truss foundations according to various embodiments of the invention. Each foundation consists of legs 5 extending above and below ground and joined together at their apex with adapter 115. Single-axis tracker bearing assemblies 120 sit atop each adapter 115 and torque tube 130 passes substantially orthogonally through each bearing assembly 120, enabling it to rotate about its own axis. Solar panels 140 are attached to torque tube 130 via mounting brackets 135. This exemplary tracker system is a bottom-up or conventional design where the torque tube is supported directly by a bearing housing assembly that rests on truss adapter 115. As shown and discussed herein, other tracker systems may employ a top-down design where the torque tube is suspended from a bearing pin received in the bearing assembly so that it can sweep through an arc like a pendulum. In such systems, the drive motor is offset from the torque tube's main axis so that the tracker's axis of rotation is the bearing pin, not the tube itself. Bearing assemblies are still attached to the head of each pile, but the axis of rotation is offset from the torque tube's main axis. One such top-down tracker system is disclosed, for example, in U.S. Pat. No. 10,222,446, which is hereby incorporated by reference in its entirety. The various embodiments of the invention are compatible with bottom-up as well as top-down or off-set trackers.

FIGS. 2A-2D are end views of various tracker systems supported by A-frame-shaped truss foundations according to the various embodiments of the invention. Starting with 2A, this figure shows an end view of tracker system 100 supported by a truss foundation. Each leg 5 of the truss foundation consists of upper leg section 18 attached to the end of screw anchor 10. In various embodiments, and as shown here, each screw anchor 10 is driven until only a portion remains above-ground and an upper leg section is attached to its end. The distal ends of upper leg portions 18 are then joined by adapter 115 to form a unitary A-frame structure which, in turn supports bearing assembly 120. In various embodiments, screw anchors 10 may be driven at symmetric angles ±θ to one another (e.g., at ±70-degrees with respect to horizontal). Adapter 115 in this example, adapter 115 has a pair of connecting portions 116 extending down and away from each other at an angle and spacing that substantially match the angle and spacing of truss legs 5.

Figure 2A:
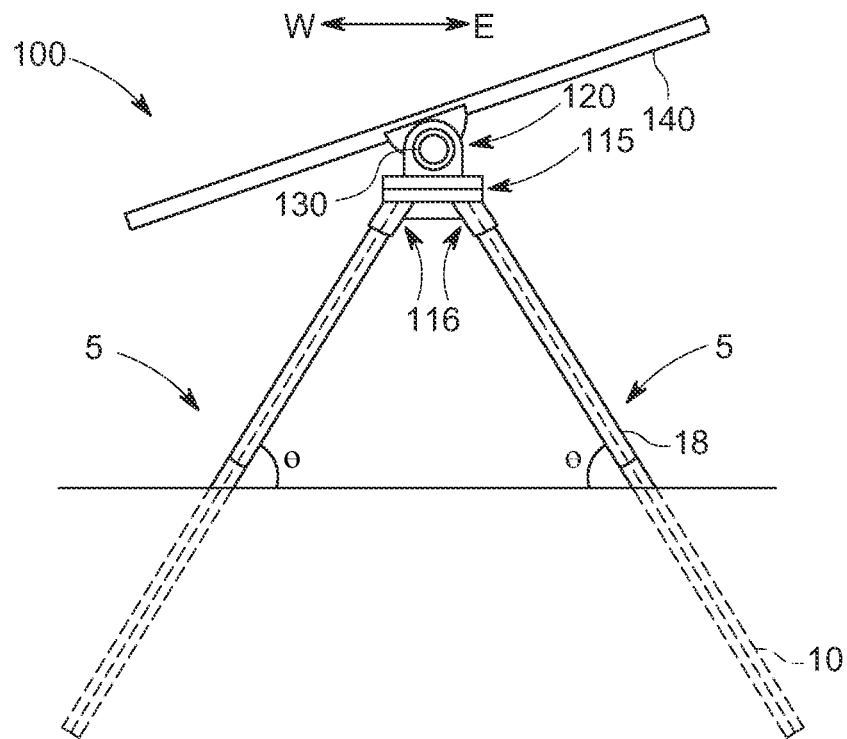
FIG. 2A is an end view of a portion of another single-axis tracker supported by a truss foundation according to various embodiments of the invention.
Figure 2B:
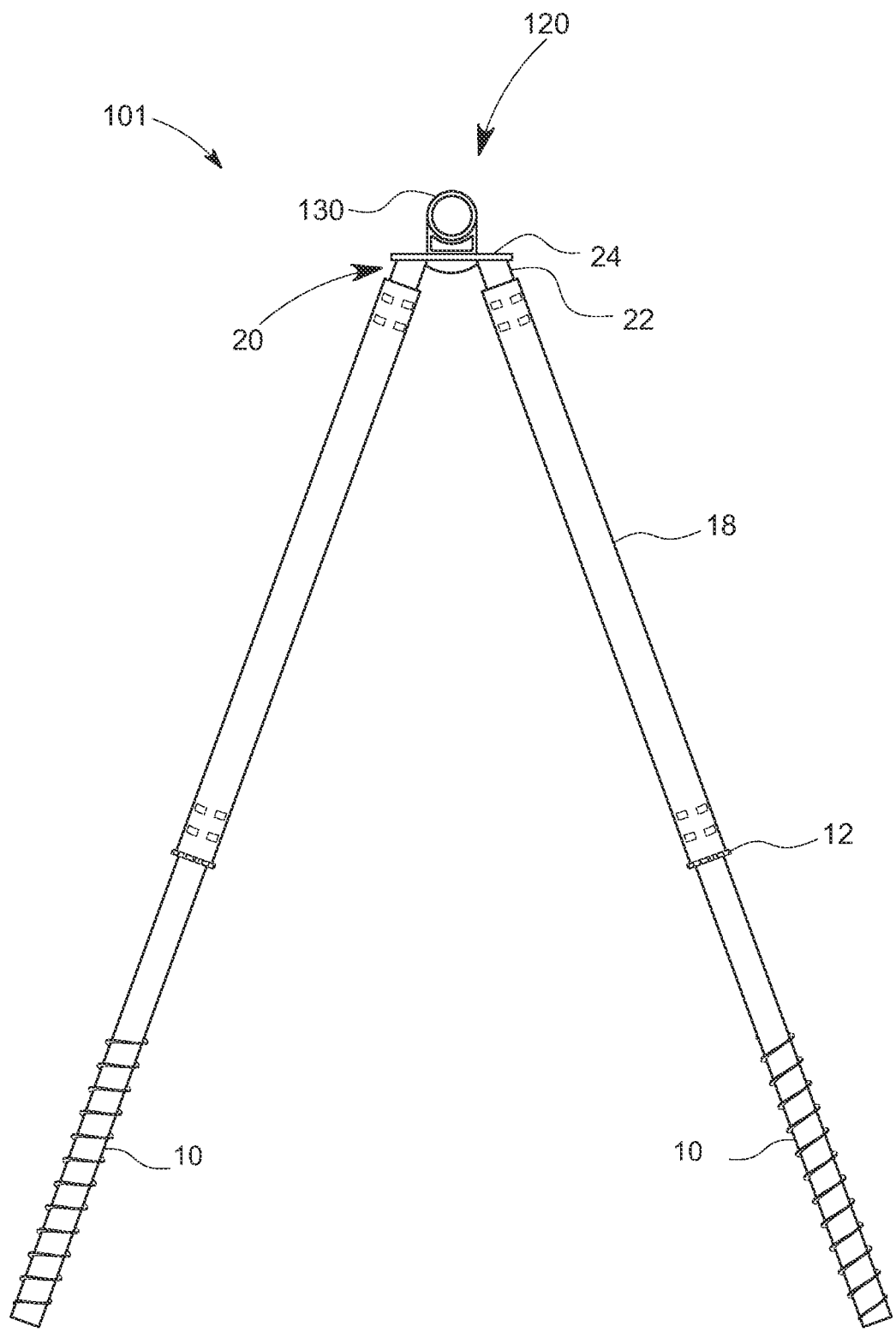
FIG. 2B is an end view of a portion of yet another single-axis tracker supported by a truss foundation according to various embodiments of the invention.

Turning to FIG. 2B, this figure shows another single-axis tracker system 101 supported by an A-frame-shaped truss foundation according to various embodiments of the invention. Tracker system 101 is another conventional design where torque tube 130 rotates about its own axis within the bearing of bearing assembly 120. Bearing assembly 120 sits on adapter or truss cap 20. Truss cap 20 provides a flat mounting platform to support bearing assembly 120 and has a pair of connecting portions 22 that are received in respective upper leg portions 18 to complete the truss foundation. As shown, each truss leg again consists of screw anchor 10 and upper leg section 18. Screw anchors 10 are elongated steel tubes with an external thread form at the below ground end and driving coupler 12 at the opposing, upper end. As shown and discussed in greater detail herein, driving coupler 12 is engaged by the chuck of a rotary driver to drive screw anchors 10 into the ground from above, as well as to provide an adapter for interconnecting upper leg portions 18 to the upper end of each driven screw anchor.

Figure 2C:
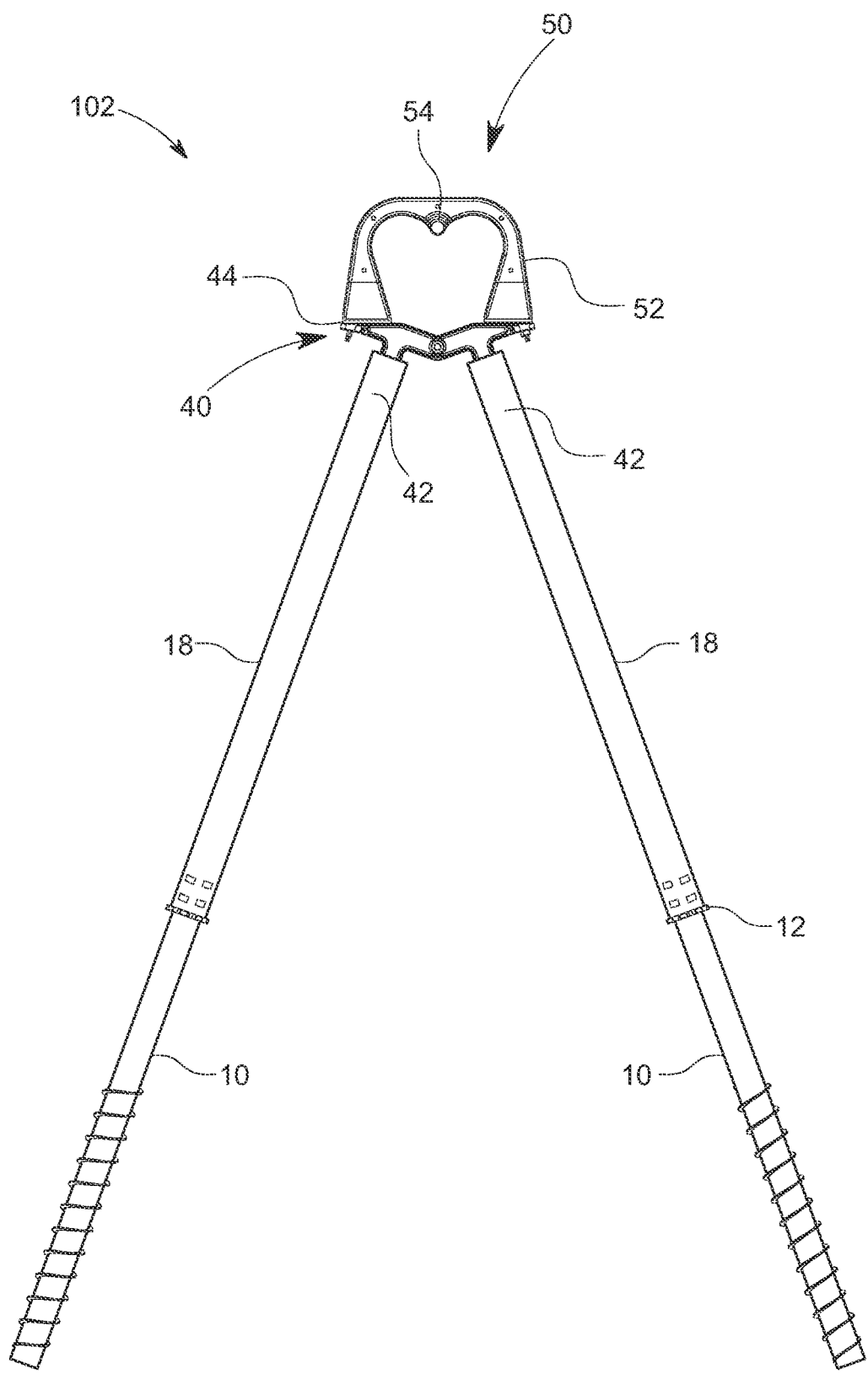
FIG. 2C is an end view of a portion of a further single-axis tracker supported by a truss foundation according to various embodiments of the invention.

FIG. 2C shows a portion of yet another single-axis tracker 102 supported by a truss foundation according to various embodiments of the disclosure. Single-axis tracker 102 shown here is a top-down design where the torque tube drive motor is offset from the main axis of the torque tube so that the tube swings through an arc rather than rotating about its own axis. As with tracker 100 shown in FIG. 2A, and tracker 101 in 2B, tracker 102 shown here is supported by two-piece truss legs consisting of screw anchors 10 and upper leg sections 18 joined together via driving couplers 12 at the upper end of each screw anchor 10. In this example, free ends of each upper leg section 18 are joined by adapter or truss cap 40. Like truss cap 20 of FIG. 2B, truss cap 40 has a pair of connecting portions 42 received in respective ones of upper legs sections 18 and a pair of upper support portions 44 that support the legs of bearing housing assembly (BHA) 50. BHA 50 is a NEXTracker product that includes an integrated bearing 54 and pair of opposing legs 52 that provide an elevated support for a bearing pin from which the torque tube is suspended. Legs 52 bound a volume of space in the East and West directions through which the torque tube may swing as the drive motor rotates the array. Pins, bolts, or other fasteners connect the bottom of each leg 52 to support portions 44 of truss cap 40.

Figure 2D:
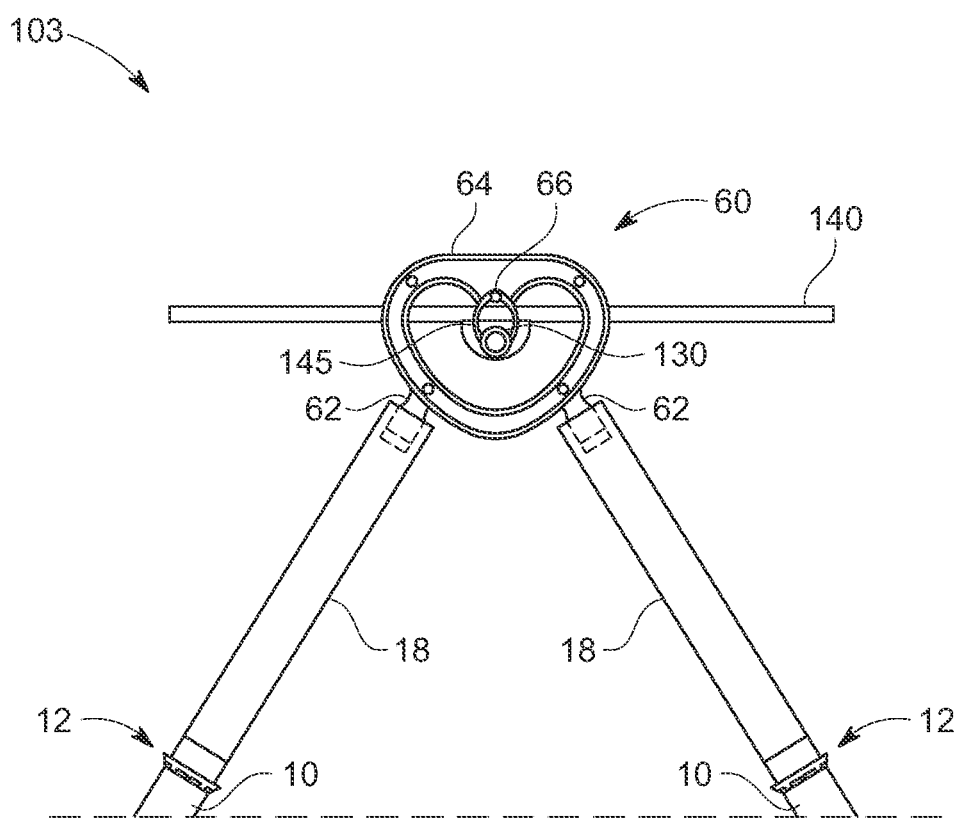
FIG. 2D is an end view of a portion of an integrated single-axis tracker and truss foundation according to various embodiments of the invention.

FIG. 2D is another example of a top-down style tracker, tracker 103. In this example, NEXTracker BHA 50 shown in tracker system 102 has been replaced with a combination BHA and truss cap or so-called bearing adapter 60, that accomplishes the function of both components. Bearing adapter 60 consists of a cardioid-shaped frame 64 with integral bearing 66 and a pair of lower connecting portions 62. A bearing pin passes through bearing 66 in the approximate middle or cusp of cardioid-shaped frame 64 as with BHA 50. Brackets 145 suspend torque tube 130 from the bearing pin seated in bearing 66. Cardioid-shaped frame 64 defines a pair of lobes on either side of bearing 66 that provide clearance for torque tube 130 to swing into at the maximum East and West tilt angles. A pair of lower connecting portions 62 project down and away from frame 64 and, in this example, are received in the upper end of respective upper leg sections 18.

Although tracker systems 100, 101, 102 and 103 are all different, each of the include a pair of adjacent truss legs joined together by an adapter, truss cap, or bearing adapter that orients the legs to substantially point at or above the rotational axis of the system. This is shown for example in FIG. 2A by the dotted lines extending from the approximate center of mass of each leg to the rotational axis of the system. In 2A, these lines extend to the center of torque tube 130 which is also the center of bearing assembly 120. Depending on whether bending moments or lateral loads dominate at any particular foundation point, the truss legs may point at a work point that is above the rotational axis of the tracker (e.g., torque tube or bearing pin), or at they may point at the rotational axis. For example, when lateral loads dominate, the truss is optimized when the work point overlaps with the rotational axis, allowing those loads to be translated into axial forces of tension and compression in the legs. By contrast, when moments dominate, such as, in some tracker systems, at foundations that support the drive motor, the truss is optimized by orienting the rotational axis below the work point pointed to by the truss legs. Doing so reduces the magnitude of the moment that must be resisted by the foundation.

Figure 3:
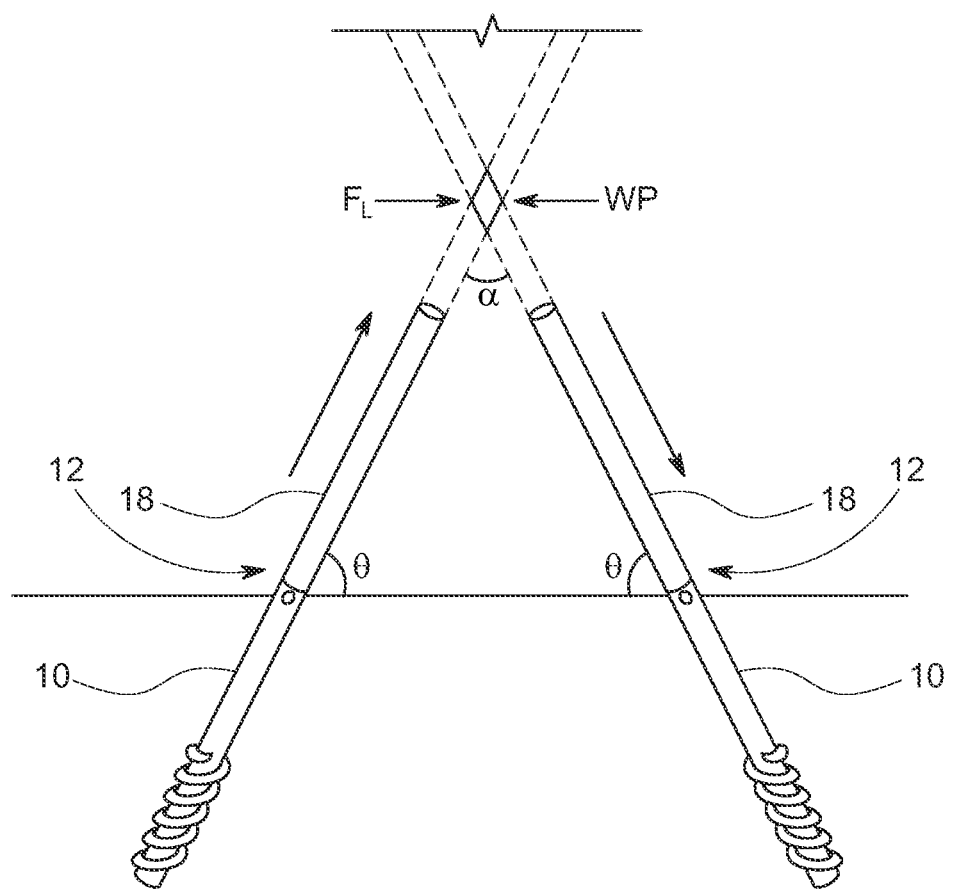
FIG. 3 shows a work point of a truss foundation according to various embodiments of the invention.

Turning now to FIG. 3, this figure shows a generic truss foundation such as that used to support the various trackers in FIGS. 2A-D with the adapter, truss cap, and/or bearing adapter as well as tracker components removed. If screw anchors 10 are aligned with respect to the torque tube, they will point at a common intersection point labeled "WP" (work point) in the figure. This point is referred to herein as the apex or work point of the truss and represents the ideal place to apply lateral loads. The location of the work point relative to the ground will vary with truss leg angle θ, top angle α, as well as with the spacing between the legs at the point where they are driven into the ground. The steeper the leg angle and/or smaller the top angle, or further apart the screw anchors are when driven into the ground, the higher the work point will be.

In a single-axis tracker, forces are translated to the foundation via the rotational axis of the system (i.e., the point where rotating parts contact the non-rotating parts). In most single-axis tracker systems, where a torque tube is captured within a bearing, the torque tube itself defines the axis of rotation so lateral forces are transferred to the foundation directly via the bearing assembly surrounding the tube. However, as discussed in the context of FIGS. 2C and 2D, in some trackers, the torque tube is offset from the axis of rotation and instead swings about a bearing pin above the tube. In this type of tracker, the axis of rotation is the bearing pin rather than the tube. In either case, when supported by a truss foundation, if lateral loads dominate, that is rotation is not resisted by the components supported by the foundation, the rotational axis should ideally pass through the work point to prevent the introduction of bending moments in response to lateral loads, because such bending moments will require additional reinforcement to resist. Using more metal to construct the legs is antithetical to the goal of reducing steel and negates some of the benefits of a truss relative to monopiles. Because this problem is unique to A-frame foundations, it is not one that tracker makers have needed to design for, however, even those who have proposed A-frame foundations for single-axis trackers in the prior art have failed to recognize the significance of work point alignment to optimize the tracker based on the types of forces that dominate at a given foundation. Alternatively, if a particular foundation is supporting a tracker component that resists unintended rotation, such as at the drive motor in most trackers, a moment is applied to the foundation and optimization occurs by orienting the rotational axis of the tracker at that foundation below the truss's work point.

In order to achieve this type of precision, as well as orientation with other foundations in the same row, it is important to control the location and angle of the truss legs with respect to each other as well as with respect to the intended axis of rotation with a high degree of precision. When installing screw anchors there are several possible modes of misalignment that could result in the legs not intersecting at desired work point. For example, the screw anchors may be aligned in the East-West direction, that is symmetric about the intended tracker row, but oriented at different angles with respect to horizontal. In other words, their respective axes intersect but not at the intended axis of rotation. In other cases, they may be misaligned so that their respective axes do not intersect (i.e., offset about the axis of rotation but perpendicular to it). In still further cases, they may be aligned and leaning too far North or too far South so that they intersect at a point below or above the desired work point. Any of these situations could reduce the efficiency of the truss and/or make it difficult to attach the torque tube and bearing assembly components and/or require post installation mitigation to reorient one or both screw anchors.

Figure 4A:
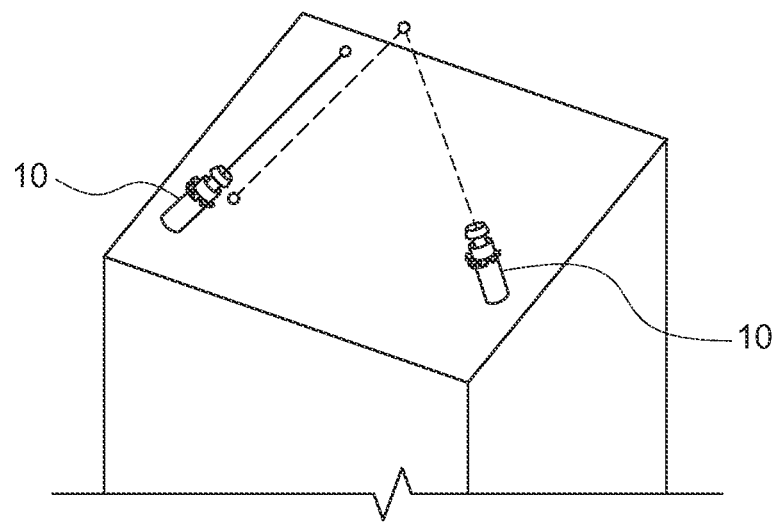
FIGS. 4A and 4B show two possible misalignment cases of a pair of driven screw anchors with respect to their intended axes of alignment.
Figure 4B:
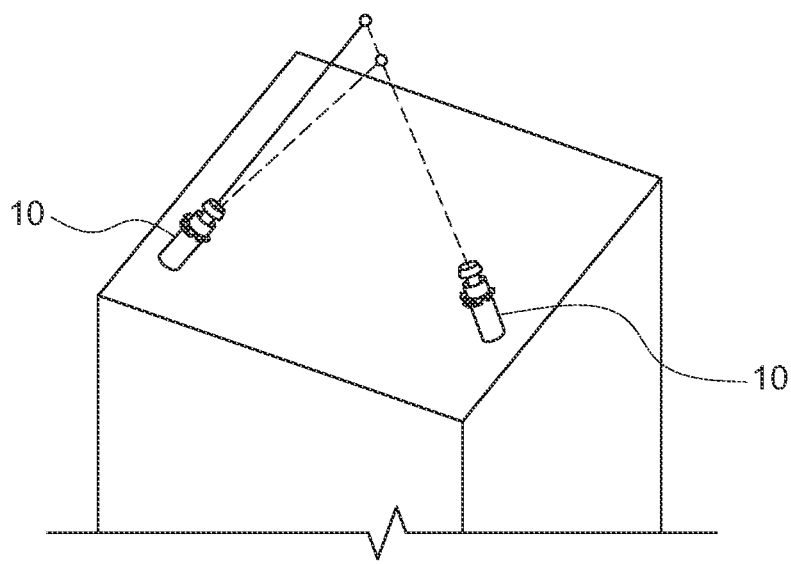

To illustrate this point, FIGS. 4A and B show two exemplary cases of axial misalignment between a pair of adjacent driven screw anchors. In 4A, the actual axis of the left screw anchor is not aligned with the right screw anchor or with respect to the desired rotational axis because the screw anchor was driven at the wrong location. The dotted line extending out of each anchor shows that the left anchor's actual axis is off the ideal and therefore does not intersect the right anchor's axis. In FIG. 4B, the base piles are aligned about the intended tracker row, but one has been driven at a steeper angle with respect to horizontal and therefore the point of intersection is above the desired rotational axis.

One way to compensate for the possible modes of misalignment shown in FIGS. 4A and B relies on flexibility inherent in the two-piece leg paradigm. By building some degree of axial adjustment in the interface between screw anchors and upper legs, and between the upper legs and the adapter, truss cap or bearing adapter, it is possible to redirect the screw anchor's misaligned axis via the upper leg when joining the upper legs to the screw anchor and to the adapter, truss cap or bearing adapter. To that end, various embodiments of the invention provide couplers for joining upper legs to driven screw anchors and joining upper legs to an adapter or truss cap that provides some (e.g., >=5-degrees) of multi- or omnidirectional axial adjustment. FIGS. 5A-B show one such coupler 12 according to various exemplary embodiments of the invention.

Coupler 12 has a main body portion with a pair of opposing male and female portions top and bottom ends, respectively. In the figure, top refers to the portion closest to upper leg 18 and bottom refers to the portion closest to screw anchor 10. Using this reference, the top end of screw anchor 10 is received in a recess in the bottom end of coupler 12. Screw anchor 10 is shown as having a substantially uniform diameter without any modifications to the upper end. In various embodiments, coupler 12 includes internal stop 15B visible in FIG. 5B that limits the extent of penetration of screw anchor 10 into the main body of coupler 12.

In various embodiments, one or more spot welds or continuous welds may be used to secure coupler 12 to the upper end of screw anchor 10. In various embodiments, the opening in the bottom of coupler 12 is circumscribed by a ledge 13. In other embodiments, one or more stops may be formed on the outer surface of coupler 12 in place of ledge 13. In the example of FIGS. 5A/B, ledge 13 has several driving features (e.g., notches) formed in it that enable a chuck or other driving head of a rotary driver to engage with it while still providing orthogonal surface area to limit the extent of penetration into upper leg 18. These notches are exemplary only. In other embodiments, facets may be cut into ledge 13 instead of notches. In still further embodiments, other shapes and/or features may be used. The specific geometry of driving features or stops in ledge 13 is a design choice.

The top portion of coupler 12 above ledge 13 is referred to generally as connecting portion 14. Connecting portion 14 consists of a pair of opposing tapered, curved, or conical surfaces 16A/16B projecting above ledge 13. Moving away from ledge 13, surface 16A increases in outside diameter up to a relative maximum. In this exemplary embodiments, gap, channel, or recess 15A is formed at the relative maximum. Gap 15A is characterized by an outside diameter that is relatively smaller than that of surfaces 16A or 16B at their respective maximum diameters on either side of gap 15A. Tapered surface 16B begins on the opposing side of gap 15A at its maximum diameter, decreasing as moving away from gap 15A. In various embodiments, gap 15A completely circumscribes coupler 12. In other embodiments, gap 15A may be formed in one or more distinct locations around the circumference of coupler 12. In various embodiments, tapered surfaces 16A/16B have slopes that are symmetric about gap 163, even if they are not the same size. It should be appreciated that although tapered or conical surfaces 162/164 are shown as continuous that in various embodiments they may be formed in two or more distinct sections. Also, one or more gaps may be formed within conical surfaces 162/164. Such modifications are within spirit and scope of the various embodiments of the invention.

In various embodiments, and as shown in 5B, upper leg 18 may have a slightly larger outside diameter than screw anchor 10 and connecting portion 14 of coupler 12. In various embodiments, connecting portion 14 of coupler 12 is received within the lower end of upper leg 18. Ledge 13 may act as a stop to limit the depth of penetration of coupler 12 within upper leg 18, although as discussed above, one or more bumps, stops or other structures may be used for this purpose. In various embodiments, at their maximum diameter, opposing tapered surfaces 16A/16B will be slightly smaller than the inside diameter of upper leg 18 or portion of upper leg 18 that engages with coupler 12. In various embodiments, this will enable upper leg 18 to be sleeved over coupler 12 and pivoted omnidirectionally about ledge 13 to be misaligned with the axis of screw anchor 10 by an angle φ ranging from 0 up to 5-degrees. The maximum extent of the angle φ will be dictated by slope of tapered portions 16A/16B. As upper leg 18 is pivoted about ledge 13, different portions of the inside surface of upper leg 18 will contact surfaces 16A/16B. In various embodiments, this may be useful to correct for misalignment of screw anchor 10 with respect to its intended drive axis redirecting the leg axis at coupler 12. Once the desired alignment between upper leg 18 and screw anchor 10 has been achieved, a crimping tool or other device may be used to deform upper leg 18 at one or more locations above gap 15A in coupler 12. In various embodiments, the void created by gap 15A will provide a place for plastic deformation of upper leg 18 to lock it to connecting portion 14 of coupler 12 at the desired orientation upon being crimped.

Figure 5C:
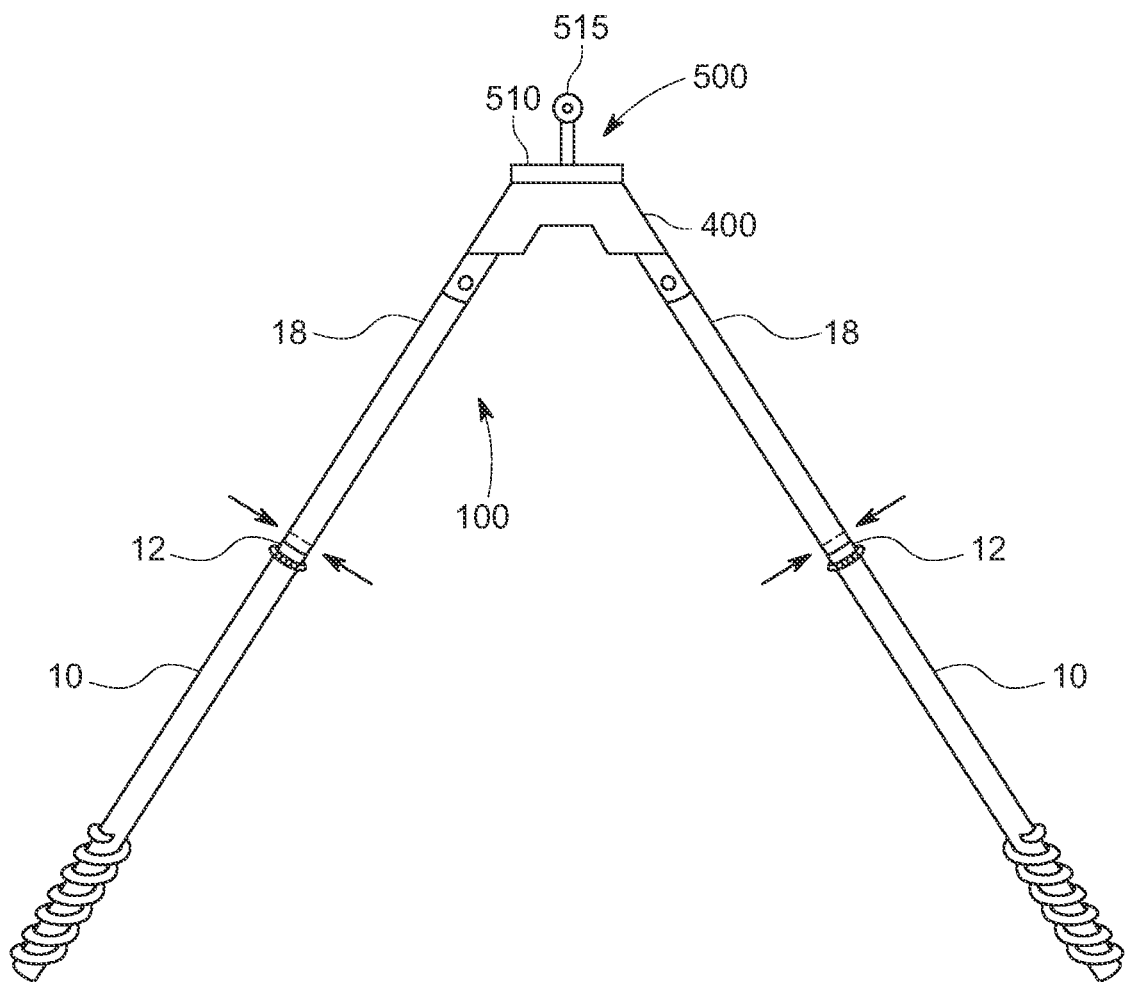
FIG. 5C shows a truss foundation and alignment jig according to various embodiments of the invention.

FIG. 5C shows one way of performing alignment in accordance with various embodiments of the invention. Adjacent screw anchors 10 are driven into supporting ground at the desired locations on either side of the North-South row where the torque tube will be positioned and at angles to one another to enable their respective axes to intersect at the intended axis of rotation. The specific mechanism and means for accomplishing the initial orientation of the machine driving the driven screw anchors will point at the intended work point is intentionally omitted here because it is the subject of other applications. Once screw anchors 10 are driven to the desired or target depth, upper legs 18 may be sleeved loosely over respective couplers 12. Then, adapter 400 is attached to the opposing end of each upper leg 18. In various embodiments, a jig or other device, such as jig 500 shown in the figure, may be placed atop adapter 400. Jig 500 may have one or more magnetic portions to enable it to be selectively attached to adapter 400. The jig shown in this exemplary figure has planar portion 510 and laser target 515. In various embodiments, target 515 may be set to approximate the height above adapter 400 of the rotational axis of the intended bearing assembly so that when the tracker components are installed, the rotational axis is oriented at the same height as other at other foundations in the same row. In various embodiments, a laser guide may be set on one of the preceding trusses in the row or on a separate support at one end of the row. In various embodiments, coupler 12 will allow upper legs 18 to be moved omnidirectionally with respect to coupler 12, as well as vertically so that adapter 400 can be oriented to place target 515 in the path of laser. Once the desired orientation is achieved, a crimping tool or other device, as discussed in greater detail herein, may be used to plastically deform upper legs 18 over channel 15A in coupler 12 to preserve the orientation. It should be appreciated that in various other embodiments, jig 500 may be built into the mast of the machine used to drive screw anchors 10 into the ground and may include an integral laser target and one or more clamps, pegs or other structures to hold adapter 400 at the correct orientation prior to sleeving upper legs 18 over connecting portions of adapter 400 and coupler 12. Micro-adjustments in both the East-West and vertical directions may be made when the bearing assemblies are attached to adapter 400 to compensate for any remaining misalignment, variances in the torque tube, or variances in other tracker components.

Depending on the top of pile loads specified by the tracker maker, the coupler shown in FIGS. 5A and 5B may not provide sufficient holding power with a single crimp where the upper leg overlaps the coupler and the adapter's connecting portions. In order to address this potential problem while staying true to the ethos of fastener-free installation, the Applicant and inventors of this disclosure have developed a coupler and crimp joint that provide greater holding power while still enabling axial misalignment between screw anchors and upper legs. To that end, FIGS. 6A and 6B a show a truss foundation system utilizing this coupler in accordance with various exemplary embodiments of the invention. As in other embodiments, the truss according to these embodiments is constructed from screw anchor 10, upper leg portion 18 and truss cap 210. Installation is once again accomplished by driving a pair of adjacent screw anchors 10 into the ground. Coupler 200 has a series of driving features 202 circumscribing it to facilitate driving with powered equipment. As shown, these features are the same as feature 13 of coupler 12, however, in other embodiments, they may be different. In addition, coupler 200 has a connecting portion 204 that extends above the coupler away from driving feature 202 with a series of channels 206, in this example three, circumscribing its outer surface. Similarly, truss cap 210 has mounting surface 213 and a pair of connecting portions 212 with channels 214 circumscribing their surfaces. In the example of 6A, bearing assembly 70 sits on top of truss cap 210. Assembly is accomplished by holding truss cap 210 is held in place above the driven screw anchors with a jig or holder on the mast of the machine used to drive the anchors. When the proper orientation is achieved, upper leg portions 18 are sleeved over connection portions 212 on the truss cap and down onto connecting portions 204 on coupler 200. A crimping tool is applied to the areas of overlap between upper leg sections 18 and respective connecting portions 204 and 212 to deform the upper leg into channels 206 and 212, improved holding power relative to the single-crimp coupler 12, with three rows of crimps at each connection point.

Figure 6A:
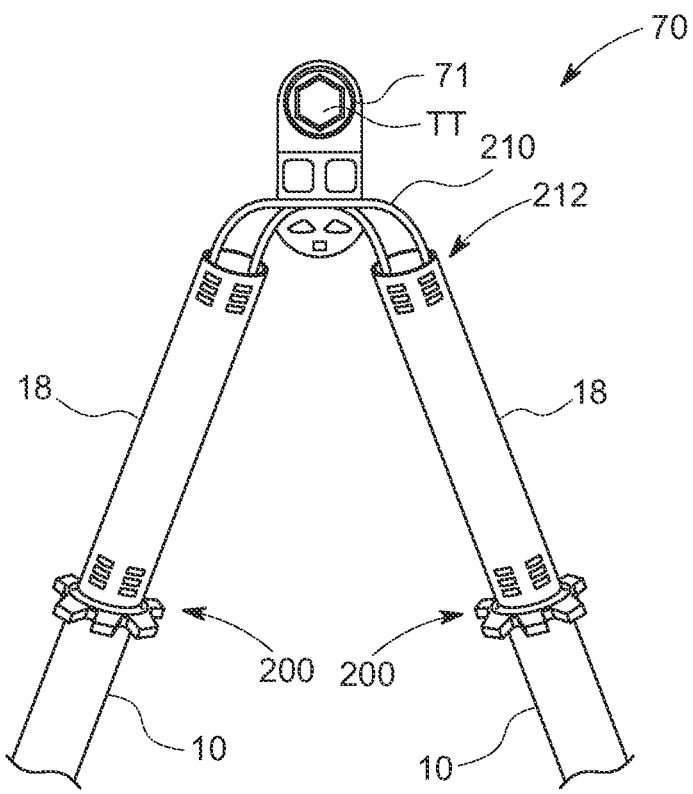
FIG. 6A shows a portion of a single-axis tracker and truss foundation according to various embodiments of the invention.
Figure 6B:
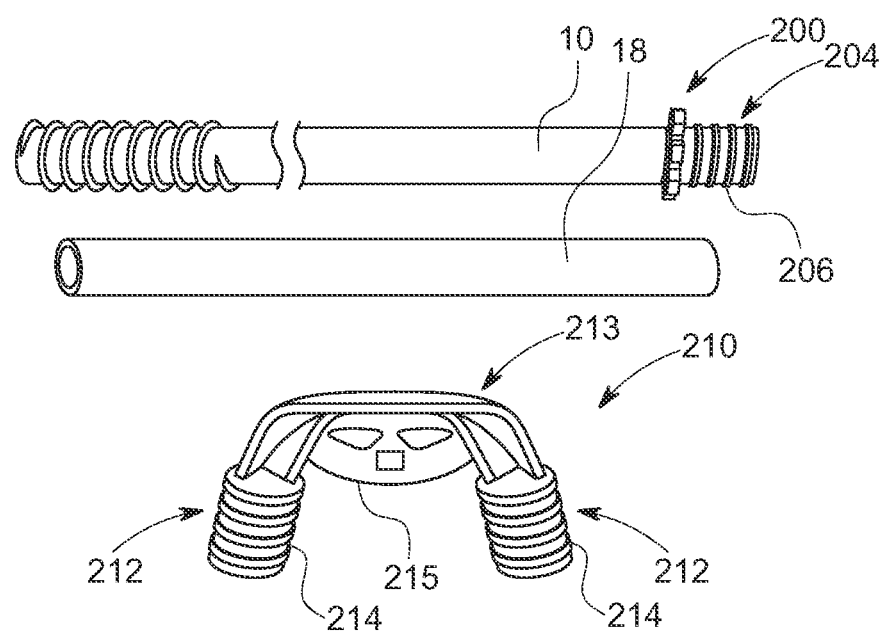
FIG. 6B is a partially exploded view of the components of the truss foundation shown in FIG. 6A.

The tracker shown in FIG. 6A is a conventional bottom-up tracker such as the DuraTrack HZ tracker from Array Technologies of Albuquerque, New Mexico. The torque tube, labelled "TT" in the figure, rotates about its own axis inside bearing 71 of assembly 70. However, the principles discussed in the context of FIGS. 6A and 6B are applicable to assembling foundations to support a variety of different trackers. For example, turning now to FIGS. 7A and 7B, these figures show a truss foundation according to various embodiments supporting another single-axis tracker. In the example of these figure, the tracker is a top-down style tracker such as the NX Horizon tracker from NEXTracker, Inc. of Fremont, CA. Leg components are the same as that shown in FIGS. 6A/B and include screw anchors 10, upper leg portions 18 joined driving coupler 200. Truss cap 220 in this example is a modified version designed specifically to support the NEXTracker bearing housing assembly, BHA 50. BHA 50 includes pair of legs 52 and bearing 54. Legs 52 sit on mounting surfaces 226 of truss cap 224. In addition to mounting surfaces 226, truss cap 224 has opposing connecting portions 222 extending down and away from the main body to match the angle of driven screw anchors 10. Each connecting portion 222 is a tubular projection with a series of recessed channels 224 circumscribing its outer surface. The truss legs, made of driven screw anchors 10 and upper leg sections 18 sleeved over connection portions 204 of coupler 200 are the same as that shown in FIGS. 6A/B. Moreover, assembly is accomplished in the same fashion, that is, by driving adjacent anchors 10, holding truss cap 220 at the proper orientation to match other truss caps in the same row, and sleeving upper leg sections 18 over each connecting portion 222 of truss cap 220 and connecting portion 204 of coupler 200 before crimping the portions of each upper leg 18 overlapping one of the connecting portions to preserve the truss cap's orientation.

Figure 8:
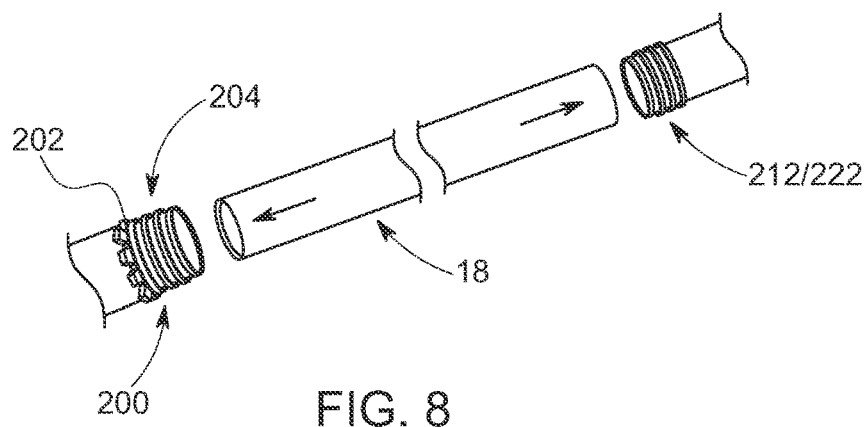
FIG. 8 is an exploded view showing the interconnection between truss leg components according to various embodiments of the invention.
Figure 9A:
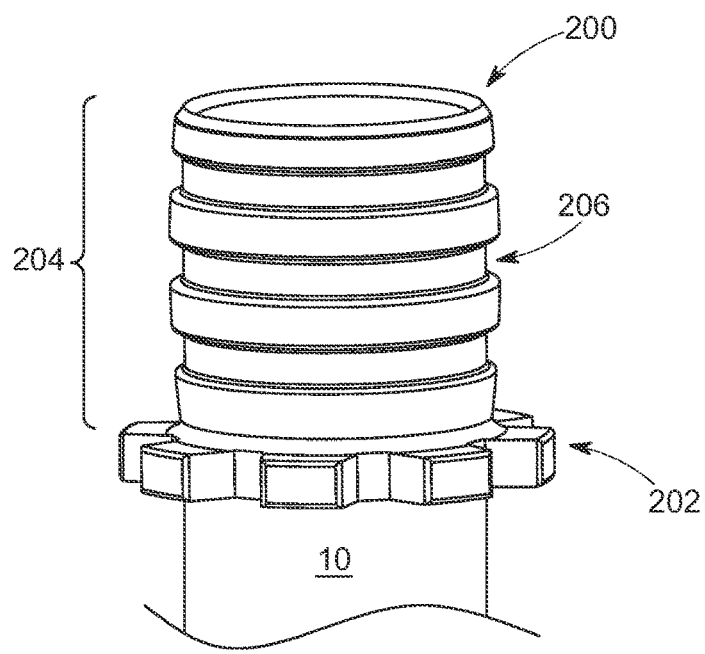
FIG. 9A is a close-up view of a driving coupler according to various embodiments of the invention.
Figure 9B:
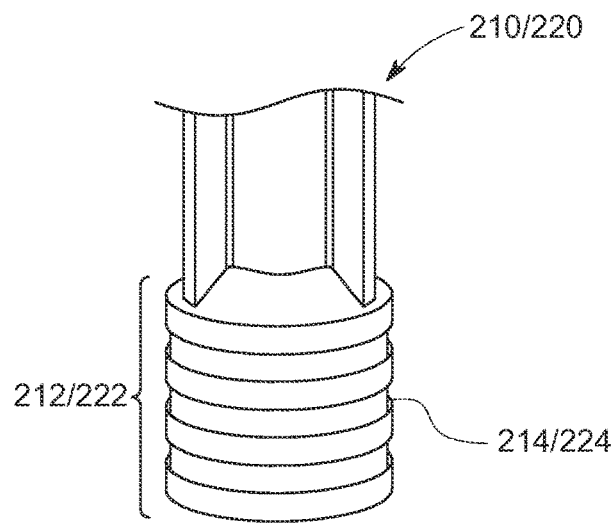
FIG. 9B is a close-up view of a truss cap connecting portion according to various embodiments of the invention.

FIG. 8 shows the shows the fitment between upper leg section 18 and respective connecting portions 212/222 of truss caps 210/220 and between the leg section 18 and connecting portion 204 of coupler 200, while FIGS. 9A and 9B show close-up views of coupler 200 and connecting portions 212/222 respectively. Starting with FIG. 8, the upper end of leg section 18 is sleeved over connecting portions 212/222. Though truss caps 210 and 220 are different, their respective connecting portions may, in various embodiments, have the same geometry. Once connecting portion 204 is cleared by the lower end of upper leg section 18, it is slide back down over connecting 204 until coming to rest against driving features 202. In various embodiments, connecting portions 212/222 are long enough to enable this installation sequence. Driving features 202 provide a stop that limits the depth of penetration of connecting portion 204 within upper leg portion 218 and a well as fixed point to pivot upper leg section 18 against.

Turning now to FIG. 9A, this figure shows a close-up view of coupler 200 including connecting portion 204. In the example shown, three channels 206 circumscribe the body of connecting portion 204. As seen in greater detail in FIG. 10, connecting portion 204 has a curved profile that reaches a relative maximum in diameter around either side of the middle channel. Similarly, connecting portions 212/222 of truss caps 210/220, shown in 9B, also have a curved profile. The curved profile portions provide up to 5-degrees or more of axial adjustment to enable a misaligned screw anchor to be connected to a properly aligned truss cap. As long as the crimper deforms upper leg section 18 into recesses 206/226, a secure connection may be effected at any angle allowable by the curved profile with greater holding power than that possible with connector 12 shown in FIGS. 5A and 5B.

Figure 10A:
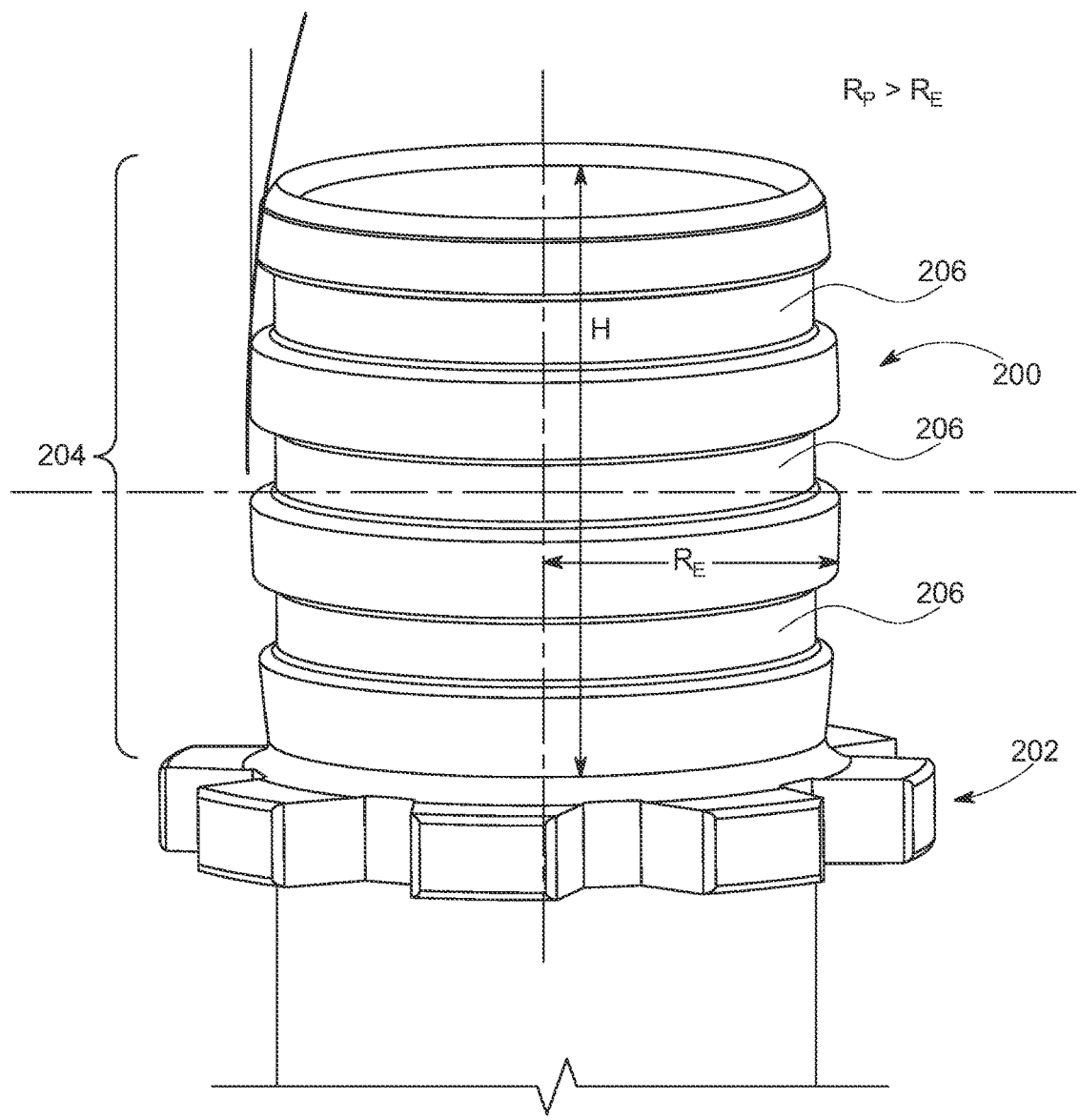
FIG. 10A is a close-up view of a driving coupler having a prolate spheroid profile according to various embodiments of the invention.
Figure 10B:
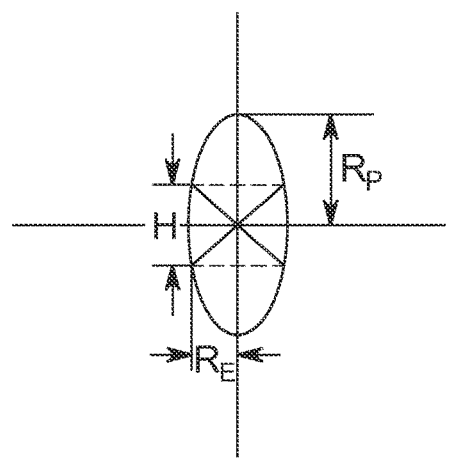
FIG. 10B is a graph showing a prolate spheroid.

FIG. 10A is a close-up view of coupler 200 and 10B shows how an oblate spheroid shape is derived. As seen in 10A, the curved profile of connecting portion 204 is roughly symmetric about the middle of the middle or second recess circumscribing its surface. This enables the upper leg section to sleeve over connecting portion 204 and angularly articulate from 0-degrees up to a maximum angle (e.g., 5-degrees) to allow the upper leg section to compensate for misalignment of the screw anchor when joining the screw anchor to the connecting portion of the truss cap. In various embodiments, connecting portions of the truss cap have the same curved profile providing twice as much total axial adjustment between the respective connecting portions of the screw anchor and truss cap. The curved profile of projecting portion 204 may be considered a portion of a prolate spheroid. Such a shape is shown, for example in the graph of FIG. 10B. An oblate spheroid is characterized by a curved, football-like profile that has larger polar radius $R_P$ than its equatorial one $R_E$. Connecting portion 204 approximates a portion of such a spheroid about either side of the middle channel. This portion is labeled "H" in FIG. 10B. Although 10A shows exemplary connecting portion 204, the same or a similarly curved profile may be used on each connecting portion 212/222 of the adapter, truss cap or bearing adapter to compensate for any misalignment between these elements intended orientation and that of the adjacent screw anchor pair.

Figure 11:
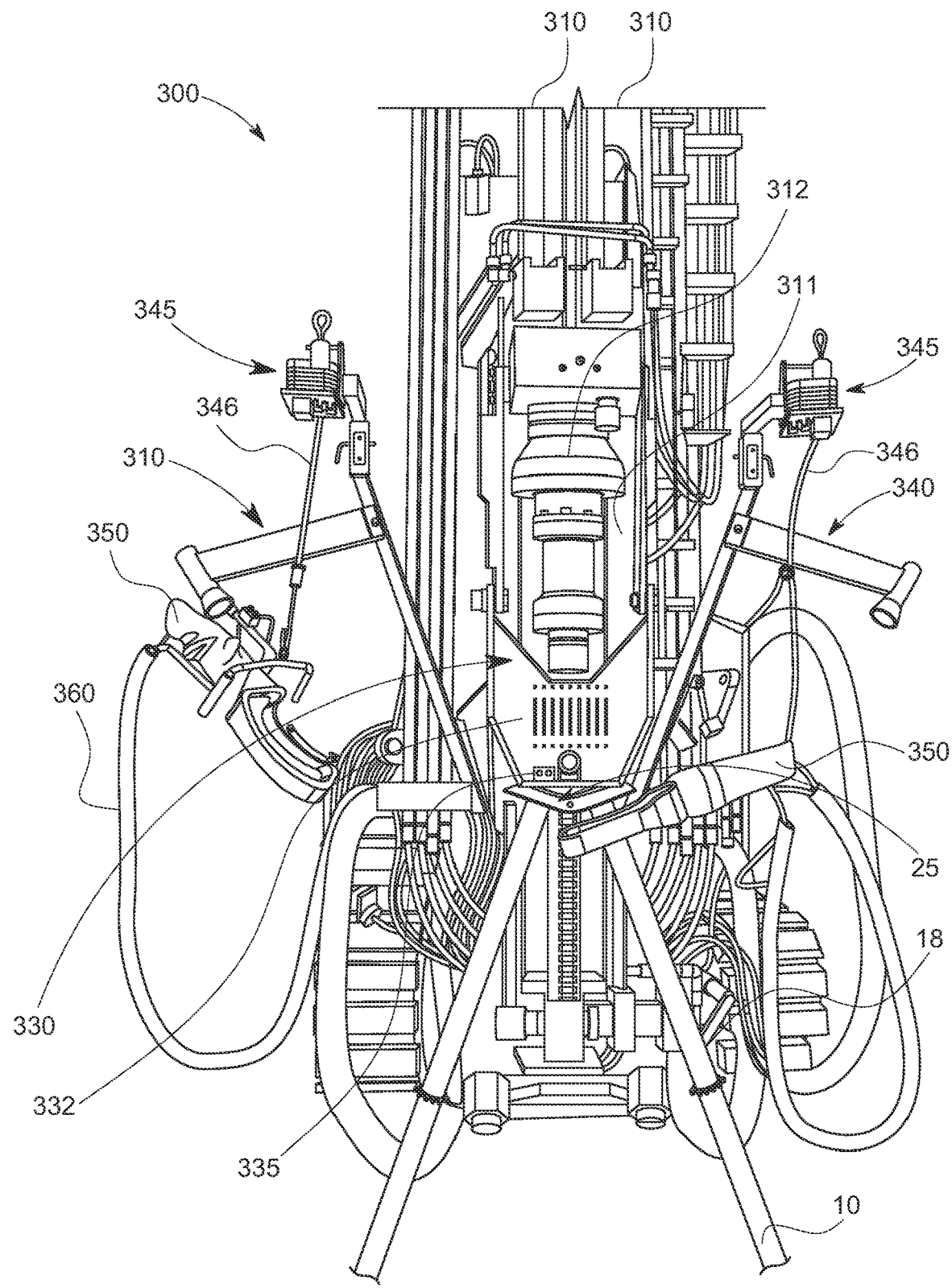
FIG. 11 is a mast view of a portion of screw anchor driving and truss assembly machine according to various embodiments of the invention.
Figure 12A:
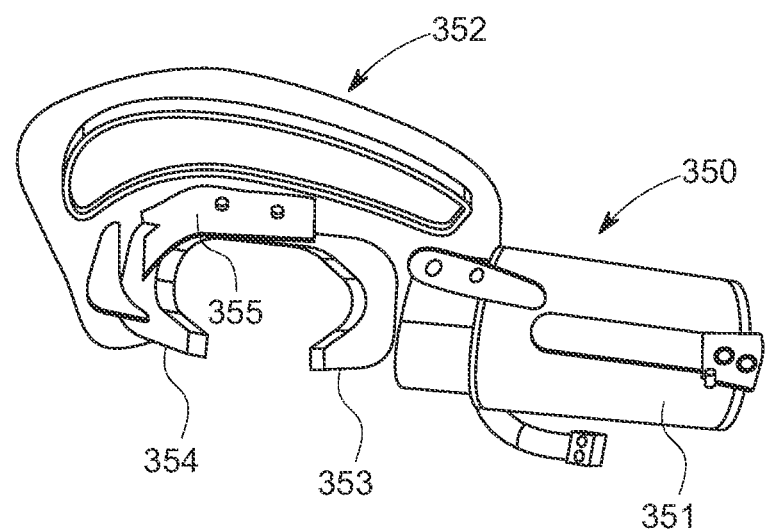
FIGS. 12A-12E show different views of a hydraulic crimping device for interconnecting truss components according to various embodiments of the invention.
Figure 12B:
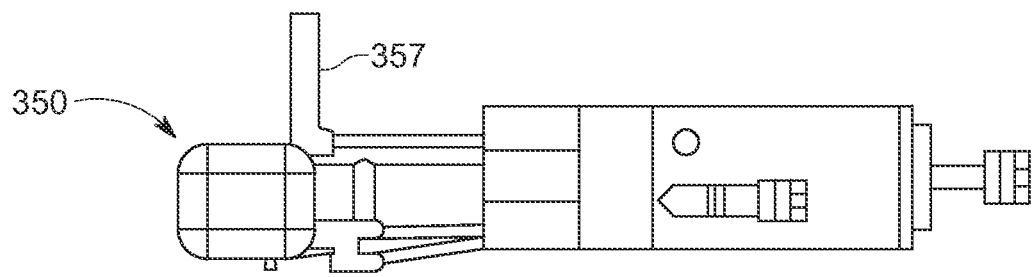
Figure 12C:
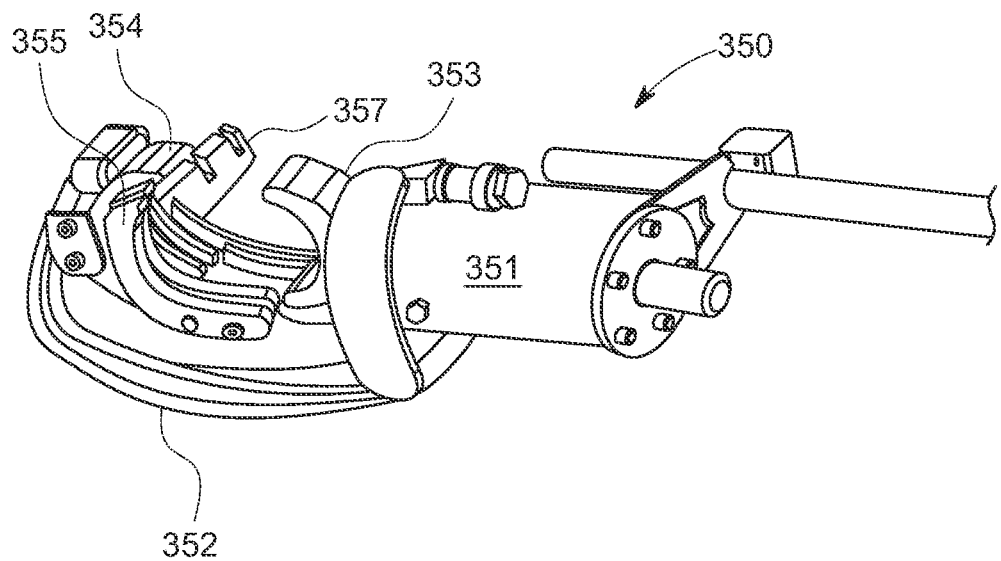
Figure 12D:
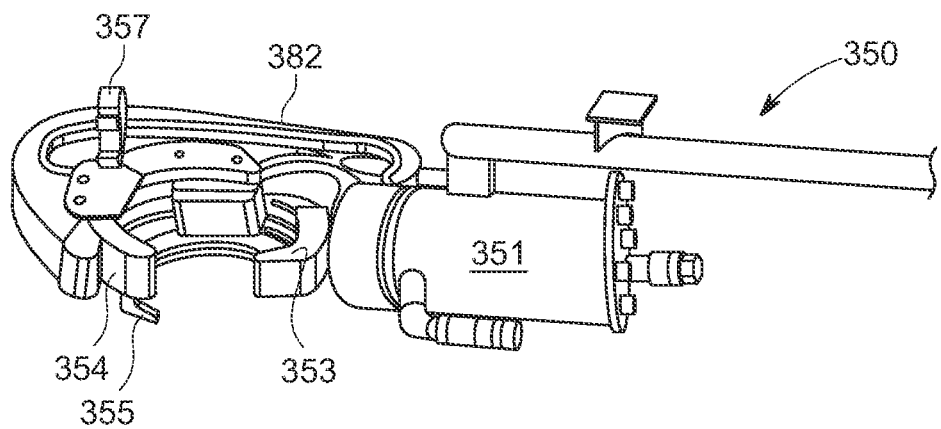
Figure 12E:
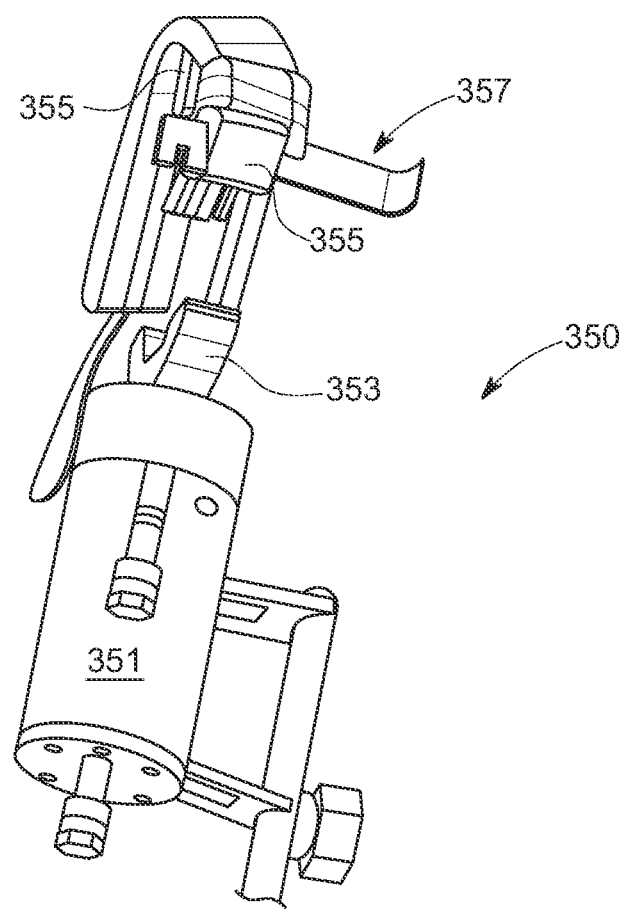

Turning now to FIG. 11, this figure shows a portion of an exemplary screw anchor driving and truss assembly machine according to various embodiments of the invention. The machine shown here is a motorized piece of heavy equipment riding on a conventional tracked chassis. The driving and assembling components of the machine reside on articulating mast 300. Mast 300 extends from one end of the tracked chassis via a multi-part linkage that allows it to move in X, Y, Z, pitch, roll and yaw with respect to the tracked chassis. Mast 300 itself is an elongated boxed steel member that supports the equipment used to drill, drive screw anchors and to orient and assemble truss foundations. A pair of parallel tracks 310 extend substantially the entire length of the mast providing tracks for lower crowd or carriage 311 to travel along. In various embodiments, upper crowd or carriage 311 is connected to a drive chain extending along the length of the mast that is driven by a hydraulic crowd motor near the base of mast 300. Rotary driver assembly 312 is attached to crowd 311. Computerized control of the rotary driver and lower crowd motor's speed and output force enables precise application of torque and downforce to screw anchors to enable them to be successfully driven into the ground at the correct position and embedment depth. Though not shown in the Figure, in various embodiments an upper crowd or carriage also travels on mast 300, above crowd 311, along rails 310 carrying a hydraulic drifter or other drilling tool that passes a drill rod and bit through the rotary driver and attached screw anchor to assist with embedment in difficult soils while the screw anchor is being driven.

As shown, lower crowd 311 also includes movable four-bar frame assembly 330 that lowers laser target 332 into and out of position for orienting the mast and assembling truss components. Assembly 330 includes so-called truss cap holder 335 that is a jig, clamp or other device that holds the truss cap at a fixed orientation that insures that tracker components will align with others in the same row. With the truss cap held in place, upper leg sections 18 may be sleeved over respective connecting portions of the truss cap and down onto one of the connecting portions of the coupler at the head of the screw anchor. Then, one or more the hydraulic crimping devices 350 may be used to lock upper leg portions 18 to their respective truss cap connecting portions and screw anchor couplers. The primary focus of this disclosure is on mast elements used to construct the truss foundation after screw anchors are driven. Therefore, details of the mast have been intentionally omitted. For greater detail on the machine and mast elements generally, see related patent application Ser. No. 16/416,022 now issued U.S. Pat. 10,697,490, the disclosure of which is hereby incorporated by reference in its entirety.

Continuing with reference to FIG. 11, a pair of hydraulic crimpers 350 are suspended from arms 340 attached to mast 300. Retractors 345 provide resistance roughly matched to the weight of each crimper to hold it in place on arm 340 when not in use and to lessen the weight felt by an operator when pulling one of the crimping devices against the resistance of cables 346. Sleeved lines 360 provide hydraulic fluid and electricity to crimpers 350 to enable their operation. As seen in the figure, after the truss cap is secured to holder 335, and upper leg portion 318 sleeved in place, one of crimpers 350 may be pulled away from arm 340 and placed around upper leg portion at the points where it overlaps with the coupler or truss cap's connecting portion to deform the upper leg section into voids formed in these structures. As discussed in greater detail herein in the context of FIGS. 12-16, upper and lower crimp guides attached to each crimper 350 insure that the crimper is placed at the proper orientation to result in deformation of the upper leg into channels formed in the connecting portions of the truss cap and coupler.

FIGS. 12A-12E show different views of crimper 350 usable to perform crimp joints between truss components according to various embodiments. Crimper 350 shown here includes claw-shaped main body portion 352 terminating in fixed jaw 354 and opposing movable jaw 353 that is moved by the action of hydraulic cylinder 351 attached to the fluid input end of the crimper. Both fixed jaw 354 and movable jaw 353 each have a series of aligned teeth, in this example three, that function as the contact surfaces to deform the upper leg section when the crimper is activated around the truss's upper leg. Crimper 350 also includes a pair of crimp guides, upper crimp guide 357 and lower crimp guide 355, that engage the truss cap and screw anchor driving coupler respectively to insure that consistent and reliable crimp connections are made each time. Crimp guides are necessary to insure consistent crimp connections because the crimps are made blind, that is, the operator can not see the recess that the teeth of the crimper need to be positioned over because they are obscured behind the upper leg.

As shown, lower crimp guide 355 includes a partial circular recess that receives driving features 202 projecting radially around the screw anchor coupler. The distance between these features and channels 206 circumscribing connecting portion 204 is known, therefore, when received in lower crimp guide 355, jaws 354 and 353 will be positioned directly above recesses 206 in the crimp collar, regardless of the angle or position of upper leg portion 18. This insures a consistent and repeatable crimp connection every time that will not vary between operators. Similarly, when upper crimp guide 357 engages a portion of the particular truss cap used in the truss foundation, jaws 354/353 will be positioned over the recessed channels in the truss cap's connecting portions.

Figure 13:
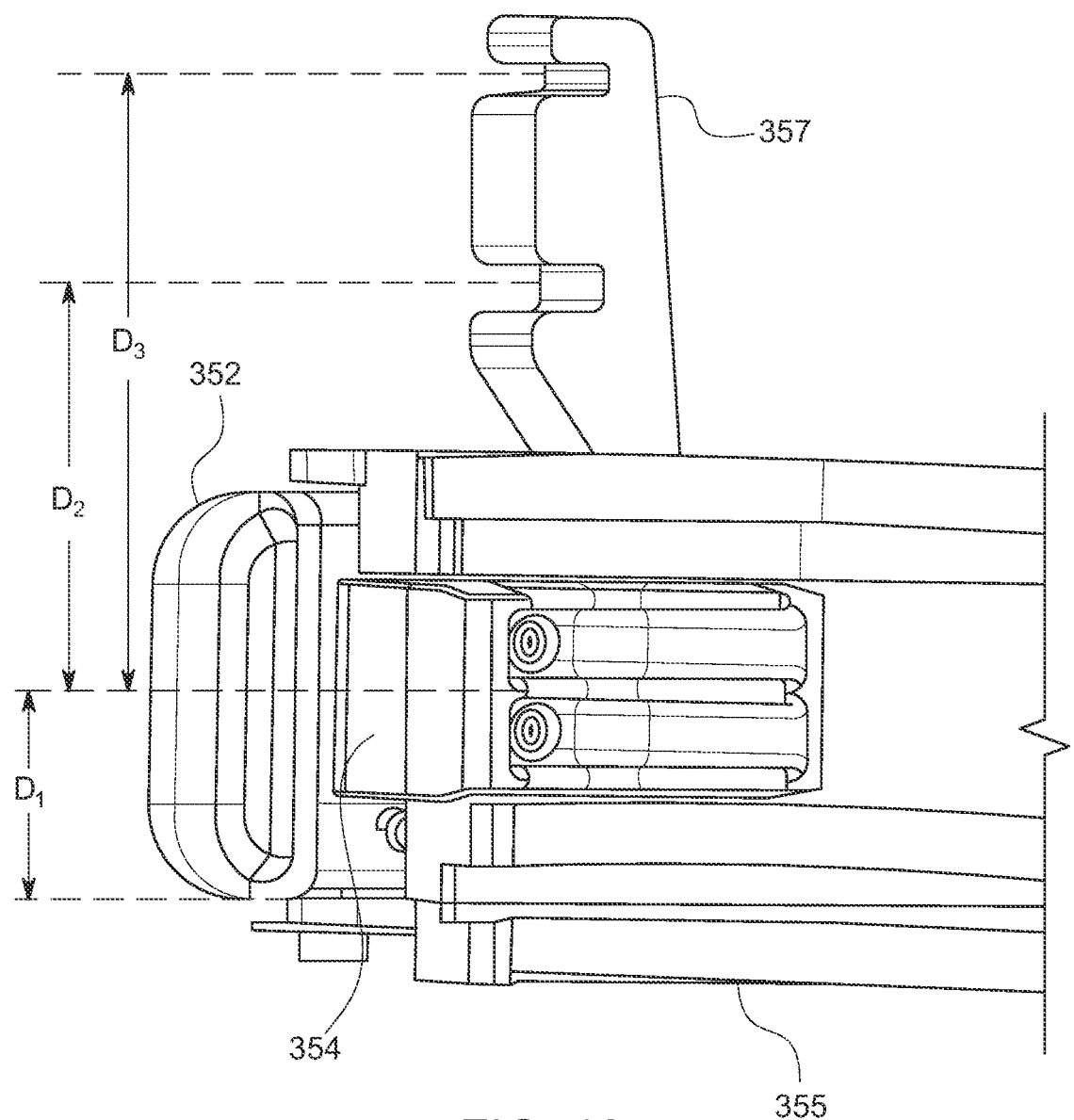
FIG. 13 is a partial close-up view of a portion of a crimping device for interconnecting truss components according to various embodiments of the invention.

The upper and lower truss guide geometry is shown in greater detail, for example, in FIG. 13. Distance $D_1$ is the distance between the center of lower crimp guide 355 and the middle tooth of fixed crimp jaw 354. Because this distance is known and constant for all screw anchor driving couplers, a consistent lower crimp between upper leg portion 18 and screw anchor 10 may be achieved every time the crimper is registered to the screw anchor by sliding the lower crimp guide around the driving features. This will be true, regardless of truss leg length, truss leg angle, work point height or screw anchor embedment depth. In various embodiments, lower crimp guide 355 includes a movable, spring loaded connection to main body 352 proximate to fixed crimp jaw 354 to enable coupler 200 to move towards fixed jaw 354 under the force of hydraulic cylinder 351 as the teeth of jaws compress the upper leg section where it overlaps recesses 206 of connecting portion 204. It should be appreciated that other distances may be used as well as long as lower crimp guide 355 is oriented at a position relative to the jaws 354 and 355 so that when it is secured around the driving features of the driving coupler, the jaws are properly oriented over the recesses in the connecting portion.

In various embodiments, upper crimp guide 357 is used in a manner similar to that of the lower crimp guide to register the position of the crimper relative to another truss component, in this case, the truss cap's connecting portions, to insure an effective crimp connection. As shown, upper crimp guide 357 has one or more recesses, hooks, or other feature that attach to a portion of the adapter, truss cap, or bearing adapter that aligns crimper jaws 354, 353 with the recessed channels formed in the truss cap's connecting portions so that once again, a consistent, maximally effective crimp connecting may be achieved, regardless of truss leg length, truss leg angle, work point height or screw anchor embedment depth. Because upper crimp guide 357 attaches to a feature or surface of the adapter, truss cap, or bearing adapter used to join the truss legs, different upper crimp guides may be required for different adapters/truss caps/bearing adapters, or, in other words, for different tracker systems as these components may be customized to support a specific tracker maker's product. Upper crimp guide 357 may include one or more slots that enable it to mechanically engage one or more features on these components. Alternatively, a single guide may have two or more such slots to enable it to work with more than one different tracker-specific truss caps. This is seen more clearly, for example, in FIG. 13. Distances $D_2$ and $D_3$ may correspond to the distance between the feature on the truss cap to which upper crimp guide 357 gets attached and the middle of one of the teeth on fixed crimp jaw 354.

Figure 14:
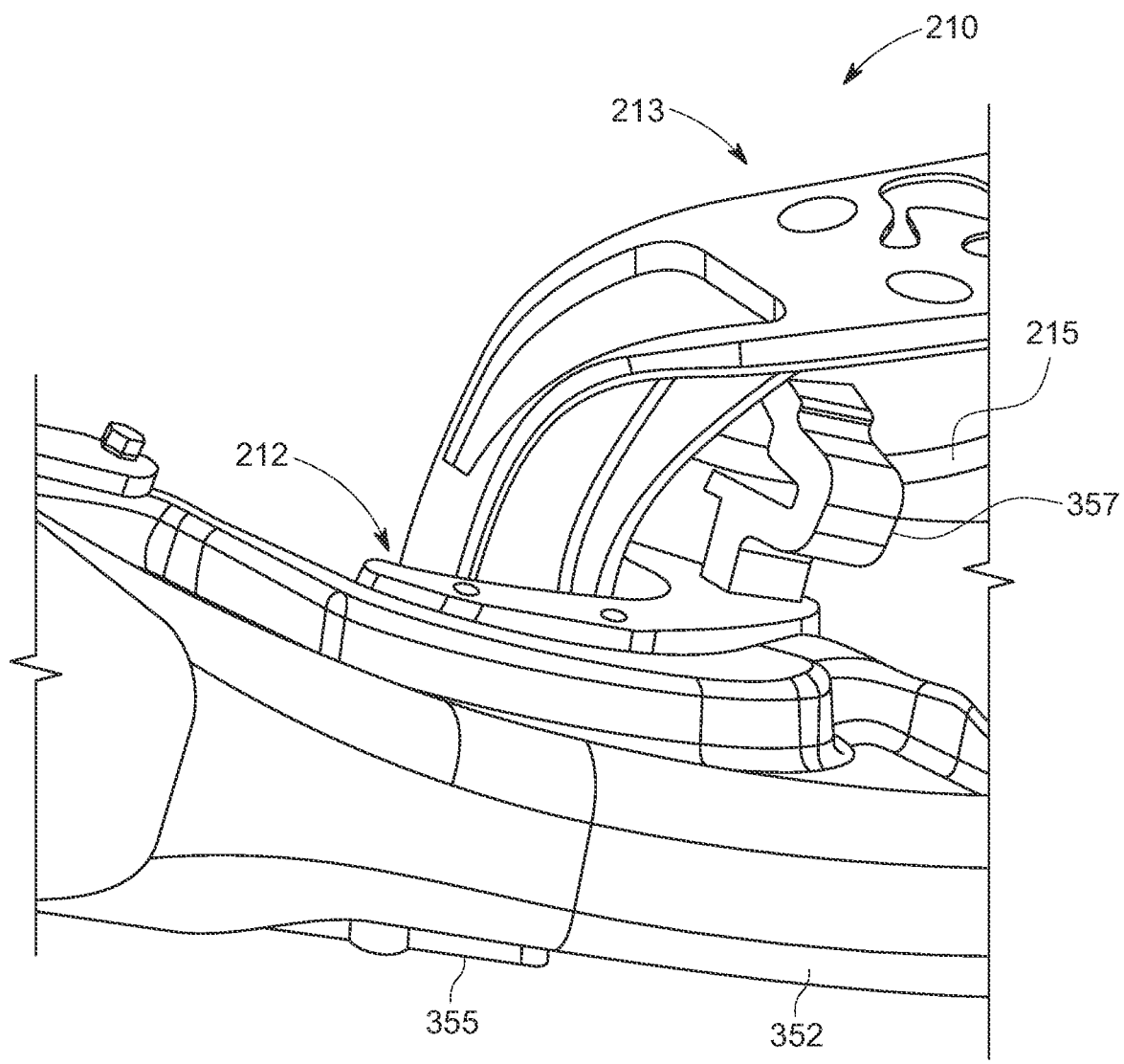
FIG. 14 is a partial close-up view of an upper crimp operation performed with a crimping device according to various embodiments of the invention.

Turning now to FIG. 14, this figure shows a portion of the fitment between exemplary upper crimp guide 357 and truss cap 210 shown in FIGS. 6A and 6B in accordance with various embodiments of the invention. In this example, upper truss guide 357 is registered to gusset 215. Crimper 350 is placed around upper leg portion 11 where it overlaps with connecting portion 212. When upper crimp guide 357 is registered to gusset 215, crimper 350 is aligned with respect to the connecting portion so that the teeth of fixed crimp jaw 354 and movable crimp jaw 353 overlap channels 214 in connecting portion 212 thereby insuring a maximally effective crimp connection between these features. In various embodiments, lower crimp guide 355 is not used in the upper crimp operation but does not mechanically interfere with the operation. It should be appreciated that the fitment between upper crimp guide 357 and truss cap 210 show in FIG. 14 is exemplary only. Upper crimp guide 357 may engage a different part of truss cap 210 so long as the geometry is leveraged to insure that the teeth of the crimper overlap with channels formed in the truss cap's connecting portions.

Figure 7A:
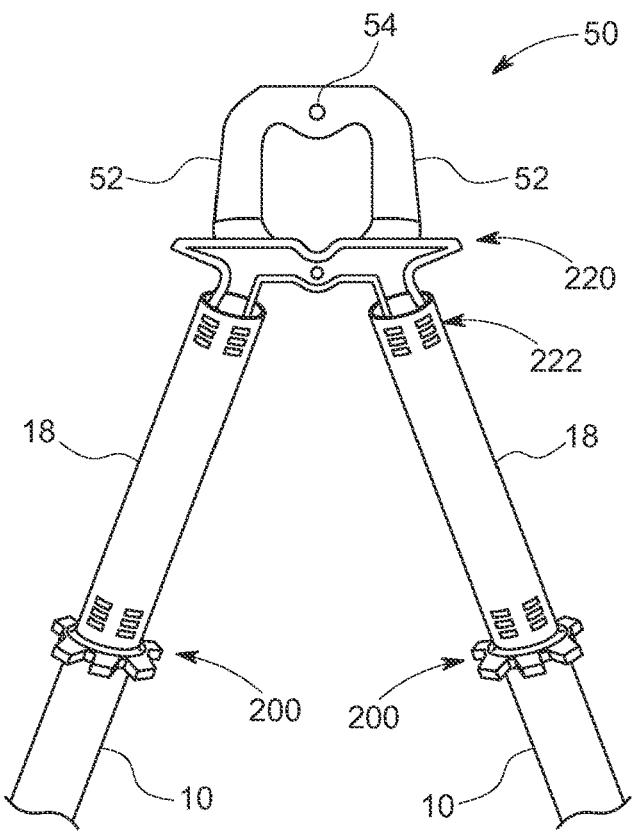
FIG. 7A shows a portion of a single-axis tracker and truss foundation according to various embodiments of the invention.
Figure 7B:
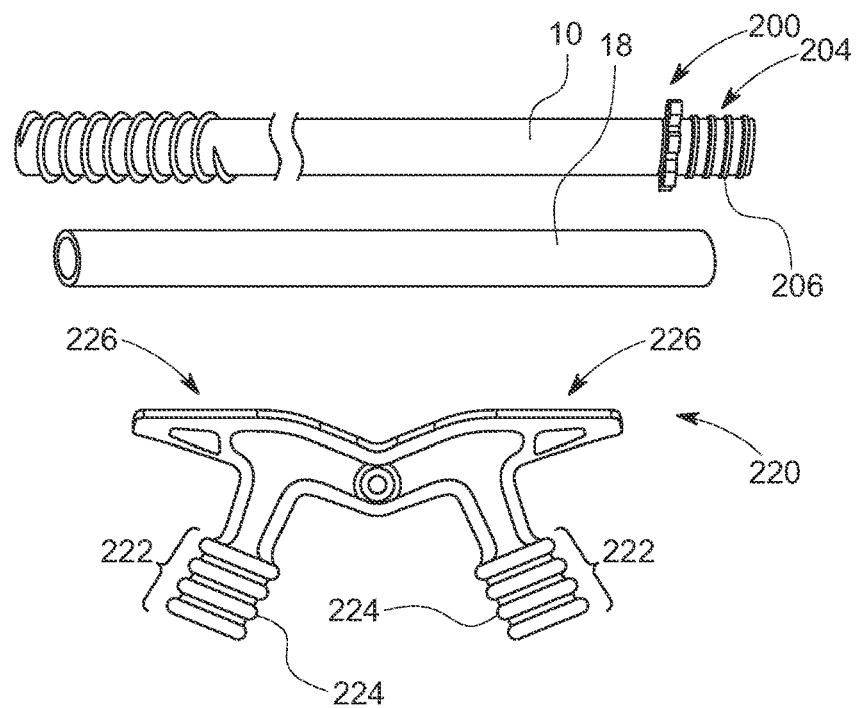
FIG. 7B is an exploded view of the components of the truss foundation shown in FIG. 7A.
Figure 15A:
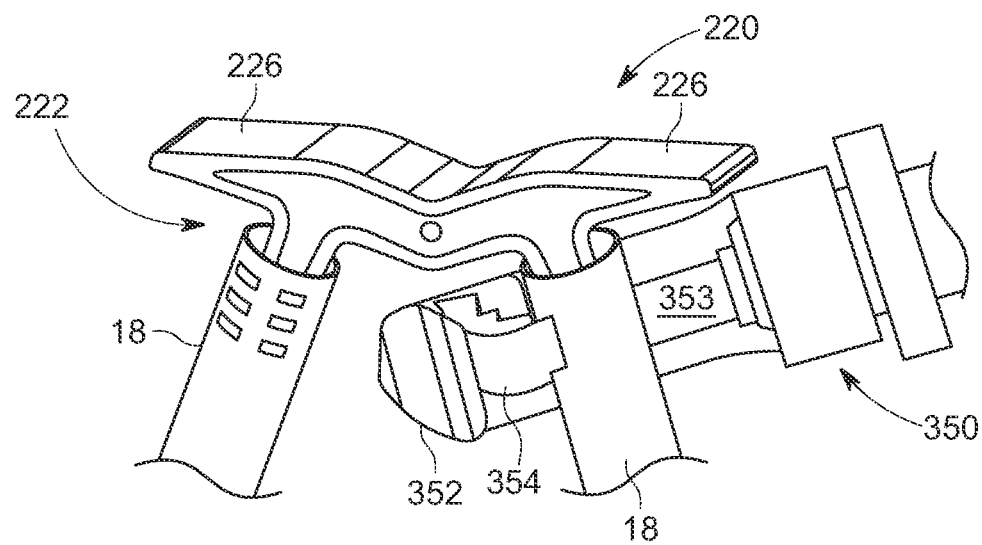
FIGS. 15A and 15B are partial close-up views of another upper crimp operation performed with a crimping device according to various embodiments of the invention.
Figure 15B:
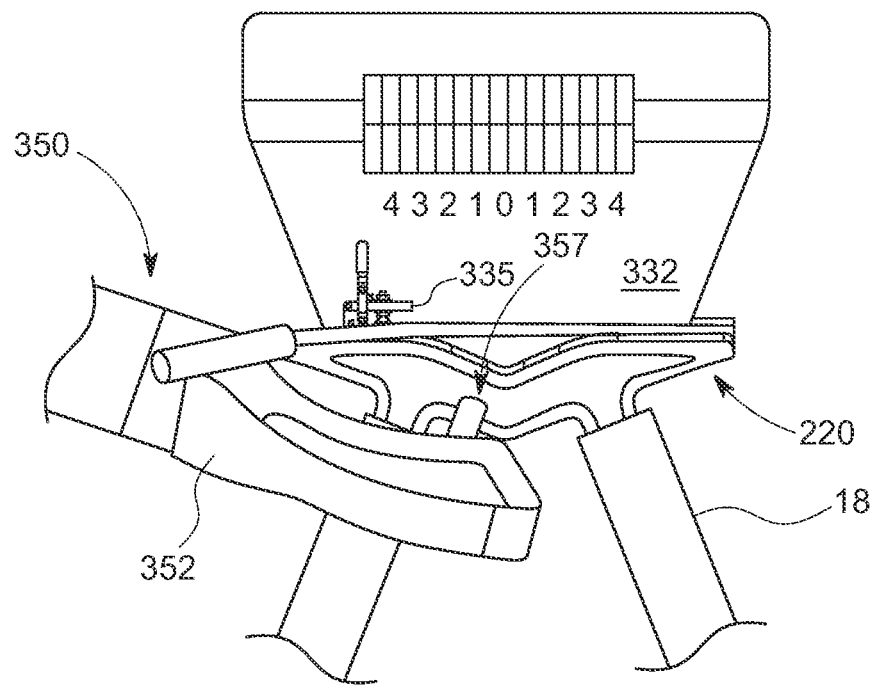

Turning to FIGS. 15A and B, these figures show crimper 350 according to various embodiments of the invention making a crimp connection between truss upper leg section 18 and exemplary truss cap 220, shown in FIGS. 7A and B. Crimper 350 is again placed around upper leg portion 18 and upper crimp guide 357 is registered to a portion of truss cap 220. In the example shown here, it is connected to a flange formed in the truss cap but in other embodiments it may be connected to a different portion of the truss cap so long as it registers with the portion of the truss cap, adapter or bearing adapter that orients jaws 354/353 of the crimper above the channels circumscribing truss cap connecting portion 220. FIG. 15B shows truss cap holder 355 holding truss cap 220 while crimper 350 is used to form a crimp connection between upper leg portion 18 and connecting portion 222. Once both ends of upper leg section 18 have been crimped, crimper 350 is lifted out of the way and truss cap holder 335 is released enabling the machine to be driven away, leaving behind a fully assembled and properly oriented truss foundation. This will reduce and ideally eliminate additional mitigation steps to reorient foundations prior to assembling tracker components.

Figure 16A:
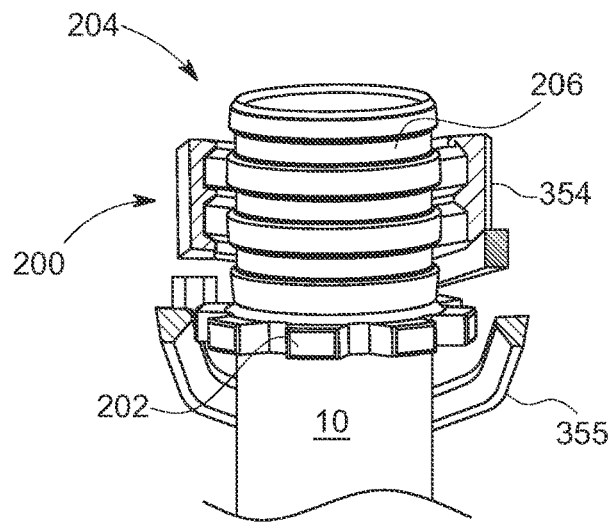
FIGS. 16A-C are partial close-up views of a lower crimp operation performed with a crimping device according to various embodiments of the invention.
Figure 16B:
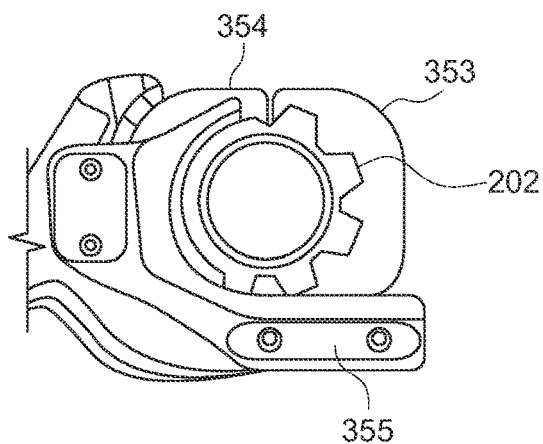
Figure 16C:
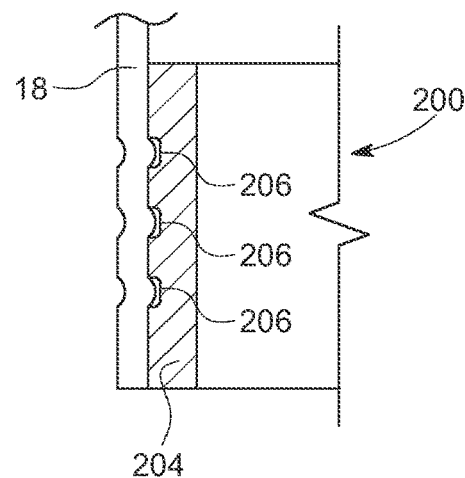

Turning now to FIGS. 16A-C, these figures show different views of an in-process lower crimp operation using crimper 350 and lower crimp guide 354 according to various embodiments of the invention. Crimper 350 is oriented so that driving features 202 of driving coupler 200 are received within lower crimp guide 355. This registers jaws 353/354 above channels 206 in coupler 200. When the hydraulic cylinder is actuated, crimper jaws 354/353 push into upper leg section 18 deforming it into recesses 206. The spring action of lower crimp guide 355 provides clearance as the jaws move closer to one another to prevent deformation of driving features 202. FIG. 16C is a cross sectional view showing a portion of the resultant crimp joint where upper leg section 18 has been deformed into channels 206.

Figure 17:
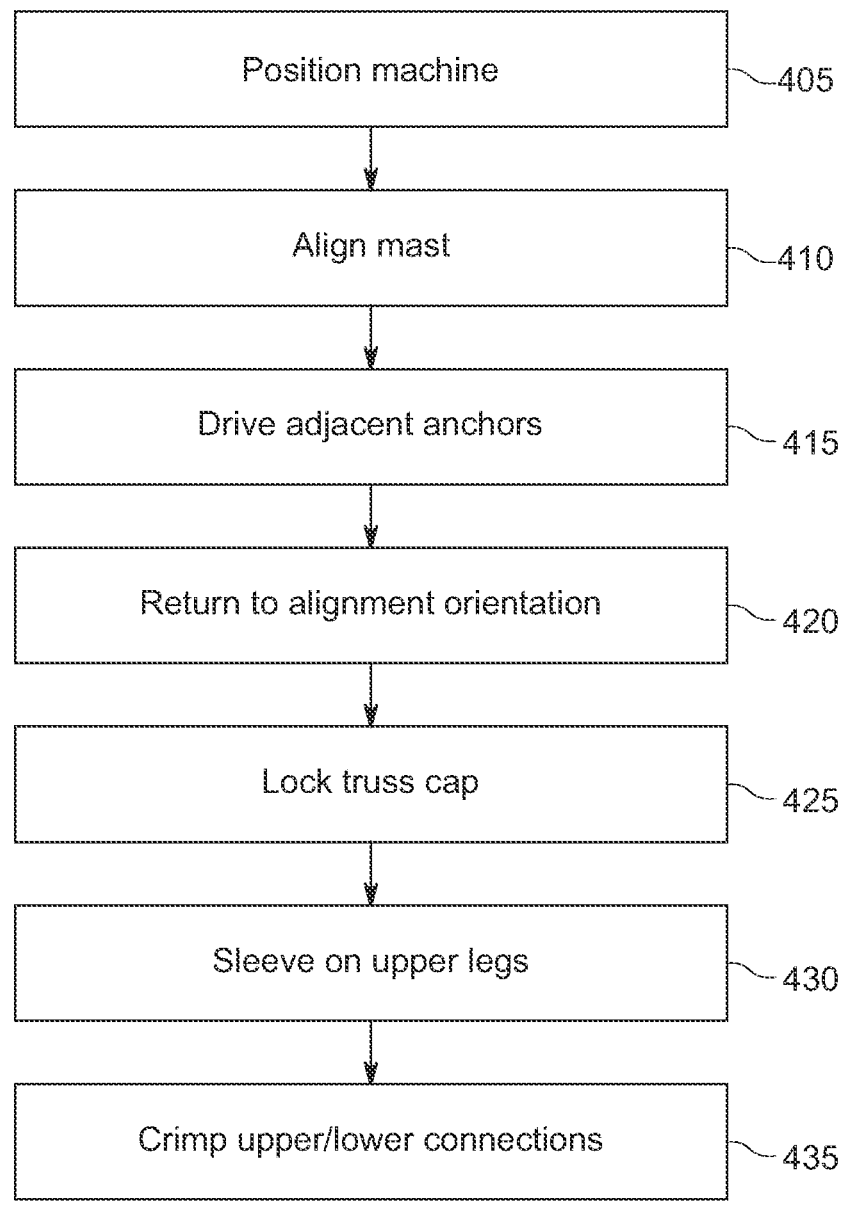
FIG. 17 is a flow chart detailing the steps of a method forming a truss foundation with a screw anchor driving and truss assembly machine according to various embodiments of the invention.

Turning now to FIG. 17, this figure is a flow chart detailing the steps of an exemplary method for forming a truss foundation with a crimper device according to various embodiments of the invention. The method begins in step 405 by positioning the anchor driving machine proximate to the desired truss location. In some embodiments this may consist of driving the machine with a remote control or manual controls on the machine proximate a marker or other ground indicator. In other embodiments, this may involve autonomous or semi-autonomous operation of the machine using one or more positioning systems such as GPS. Then, in step 410, the mast is aligned. In various embodiments, positioning the machine provides coarse control so that the mast can reach the target driving axis while alignment provides the fine control that orients the mast so that the screw anchor will be embedded along the desired driving axis with a high degree of precision (e.g., less than ½ of an inch of variance). The specific details of how mast orientation is accomplished is the subject of a different disclosure and has been intentionally omitted here. Such details may be found, for example, in commonly assigned U.S. patent application Ser. No. 17/073,177 hereby incorporated by reference in its entirety. At a high level it involves orienting the mass in pitch, roll, yaw, x, y, and z so that the drive axis of the rotary driver is aligned with the intended drive axis.

Once mast alignment is complete then, in step 415, a pair of screw anchors are driven. In some embodiments, this may involves driving them sequentially. For example, the mast may rotate to a loading orientation so that a screw anchor may be loaded onto the rotary driver's chuck. Then, an operator initiates an automated driving process for that screw anchor causing the anchor to be driven to the target embedment depth. Once completed, the mast may return to the loading orientation so that a second screw anchor may be loaded before orienting to the second driving axis and driving the adjacent anchor to its target embedment depth. In other embodiments, step 415 may involve simultaneously driving two anchors in overlapping time with a machine having two rotary drivers. Once both anchors have been successfully driven, the mast of the machine is returned to the alignment orientation. As discussed in greater detail in commonly assigned U.S. patent application Ser. No. 17/095,616, hereby incorporated by reference in its entirety, the alignment position may orient a jig, truss cap holder or other fixture on the lower crowd of the mast at a specific orientation to be consistent with others in the same tracker row. With the mast of the machine at the alignment orientation, in step 425, a truss cap, adapter or bearing adapter is attached to the truss cap holder on the mast. The truss cap holder may be an over center or toggle clamp such as that shown in FIG. 11 or may be another suitable structure. Proper alignment of the mast insures that the truss cap will support the tracker bearing at a position in space that is consistent with other bearings in the same row. Then, in step 430, with the truss cap, adapter or bearing adapter held in place, upper leg sections are sleeved over the connecting portions of the truss cap and down onto the couplers at the upper end of each driven screw anchor. With the truss components loosely in place, in step 435, a crimping device is put in place to make upper and lower crimp connections between the upper leg section and truss cap at the upper end, and between the former and the screw anchor's driving coupler at the lower end, thereby completing the truss assembly.

Figure 18:
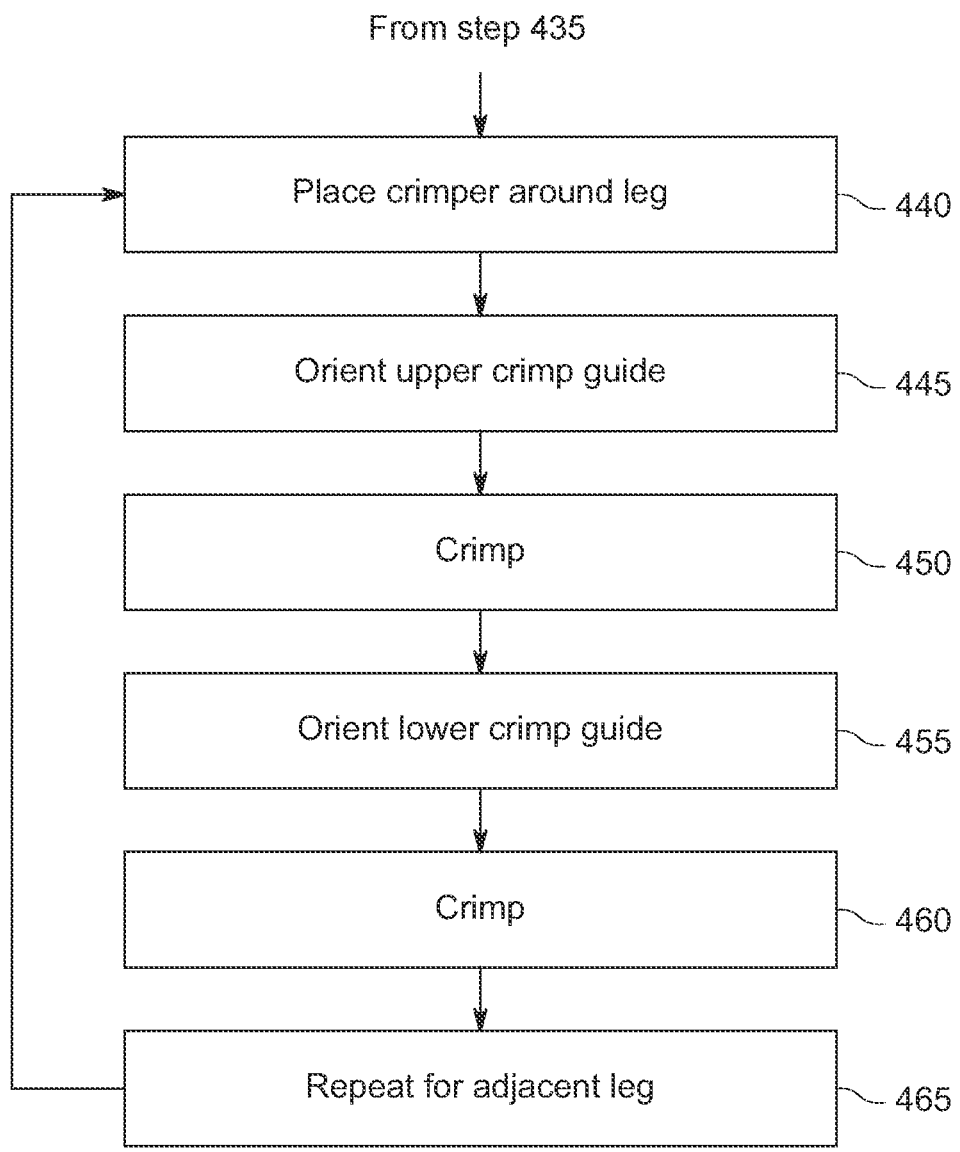
FIG. 18 is a flow chart detailing the steps of a methods for crimping together truss components according to various embodiments of the invention.

FIG. 18 is a flow chart detailing the steps of crimping from step 435 from the flow chart of FIG. 17 according to various embodiments of the invention. The method begins in step 440 where the crimper is moved so that its jaws surround the upper leg section to be crimped. In step 445 the crimper is moved along the upper leg until the upper crimp guide physically registers with the truss cap, adapter or bearing adapter via the upper crimp guide. As shown and described herein, in various embodiments, this consists of attaching the upper crimp guide to a portion of the truss cap, adapter or bearing adapter that is a known and constant distance from the channels formed in the channels of the connecting portions of those structures. In step 450, the operator depresses a button or other control that actuates the crimper's hydraulic cylinder to extend, thereby effecting the crimp operation. Once complete, the cylinder releases pressure and retracts. Then, in step 455, the operator moves the crimping device down the leg so that the lower crimp guide receives the ring of driving features on the driving coupler at the top of the screw anchor while the jaws of the crimper surround the upper leg. In step 460, the operator again depresses a button other control that actuates the crimper's hydraulic cylinder to move the movable jaw towards the fixed jaw. The geometry of the lower crimp guide relative to the jaws of the crimper insures that the jaws deform the upper leg into the channels formed in the crimp coupler. In step 465, steps 440 through 460 are repeated for the adjacent truss leg. Alternatively, if two crimping devices are available, a second operator may perform these steps on the adjacent truss leg in parallel, that is, at the same time as they are being performed on the first truss leg. It should be appreciated that instead of an operator moving the crimping device on to the upper leg section, an automated crimping device may instead be used to achieve position accuracy in the same way, that is by registering its position relative to the truss cap and/or driving coupler to insure that the jaws of the crimping device are positioned over the channels formed in the connecting portion of the truss cap and driving coupler.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A coupler for joining two elongated foundation components along a substantially common axis, the coupler comprising:
    a main body portion;
    at a first end, a receiving portion projecting away from the main body portion in a first direction for receiving one end of a first elongated foundation component; and
    at a second, opposing end, a connecting portion projecting away from the main body portion in a second opposing direction, the connecting portion received in an open end of a second elongated foundation component, the connecting portion comprising a projection having a curved profile with a plurality of orthogonal channels circumscribing the projection, the channels separating the connecting portion into respective sections, and
    at least one driving feature extending out from the main body at a base of the connecting portion, the at least one driving feature providing a feature for transmitting torque to the coupler and limiting an extent of penetration of the connecting portion into the second elongated formulation component.

2. The coupler according to claim 1, wherein the projection has a prolate spheroid-shaped profile.

* * * * *